United States Patent
Colbeck et al.

(10) Patent No.: US 11,196,347 B2
(45) Date of Patent: Dec. 7, 2021

(54) APPARATUS AND METHODS FOR CONTROLLING A SWITCH DRIVE SIGNAL FOLLOWING MODE TRANSITIONS IN A SWITCHING POWER CONVERTER

(71) Applicant: POWER INTEGRATIONS, INC., San Jose, CA (US)

(72) Inventors: Roger Colbeck, Ottawa (CA); Robert J. Mayell, Los Altos, CA (US); Hartley Fred Horwitz, Ottawa (CA); Lino Del Pup, Carp (CA)

(73) Assignee: Power Integrations, Inc., San Jose, CA (US)

( * ) Notice: Subject to any disclaimer, the term of this patent is extended or adjusted under 35 U.S.C. 154(b) by 198 days.

(21) Appl. No.: 16/696,524

(22) Filed: Nov. 26, 2019

(65) Prior Publication Data

US 2020/0195155 A1 Jun. 18, 2020

Related U.S. Application Data

(60) Provisional application No. 62/779,315, filed on Dec. 13, 2018.

(51) Int. Cl.
*H02M 3/335* (2006.01)
*H02M 1/08* (2006.01)
*H02M 1/36* (2007.01)
*H02M 1/44* (2007.01)
*H02M 1/00* (2006.01)

(52) U.S. Cl.
CPC ....... *H02M 3/33569* (2013.01); *H02M 1/083* (2013.01); *H02M 1/36* (2013.01); *H02M 1/0035* (2021.05); *H02M 1/0058* (2021.05); *H02M 1/44* (2013.01)

(58) Field of Classification Search
CPC .......... H02M 3/33596; H02M 3/3376; H02M 3/33523; H02M 1/083; H02M 1/36; H02M 1/0035; H02M 1/0058; H02M 1/44; H02M 1/0025; H02M 1/0064; Y02B 70/10
See application file for complete search history.

(56) References Cited

U.S. PATENT DOCUMENTS

| | | | |
|---|---|---|---|
| 10,250,126 B1* | 4/2019 | Chen ................ | H02M 3/33569 |
| 2018/0054134 A1* | 2/2018 | Moon ............... | H02M 3/33546 |
| 2018/0131285 A1* | 5/2018 | Stuler ............... | H02M 3/3376 |

OTHER PUBLICATIONS

TEA19161T—Digital Controller for High-Efficiency Resonant Power Supply, Rev. 1, Mar. 10, 2016, 46 pages.

\* cited by examiner

*Primary Examiner* — Emily P Pham
(74) *Attorney, Agent, or Firm* — Christensen O'Connor Johnson Kindness PLLC

(57) ABSTRACT

A controller for use in a power converter that is configured to operate in a plurality of modes including a first mode and a second mode includes a frequency monitor module coupled to measure a signal characteristic of a switch drive signal coupled to control switching of a switches block of the power converter. The frequency monitor module includes a memory coupled to store a measured signal characteristic of the switch drive signal measured during the first mode. The frequency monitor module is coupled to generate a clock signal in response to the measured signal characteristic stored in the memory. The switch drive signal is coupled to be generated in response to the clock signal during the second mode.

48 Claims, 16 Drawing Sheets

APPARATUS AND METHODS FOR CONTROLLING A SWITCH DRIVE SIGNAL FOLLOWING MODE TRANSITIONS IN A SWITCHING POWER CONVERTER

CROSS-REFERENCE TO RELATED APPLICATIONS

This application claims the benefit of U.S. Provisional Application No. 62/779,315, filed on Dec. 13, 2018, incorporated in its entirety herein by reference.

BACKGROUND INFORMATION

Field of the Disclosure

The present invention relates to controlling a switch drive signal following mode transitions in a switching power converter and more particularly to monitoring and controlling switch drive signals using a frequency monitor module in a series inductor-inductor capacitor (LLC) converter.

Background

Many electronic devices, such as cell phones, laptops, etc., are powered by direct current (dc) power derived from a power supply. Conventional wall outlets generally deliver a high voltage alternating current (ac) power that needs to be converted to regulated dc power in order to be used as a power source for consumer electronic devices. Switching power converters are commonly used due to their high efficiency, small size, and low weight to convert a high voltage ac power to a regulated dc power.

One type of switching power converter is a resonant converter, which includes a resonant circuit (e.g., inductor(s) and capacitor(s)) as part of a power module. A resonant circuit may advantageously enhance power conversion efficiency by availing zero-current and/or zero-voltage switching.

A subset of resonant converters, the series inductor-inductor capacitor (LLC) converter, uses a resonant circuit with two inductors and one capacitor connected in series to form an LLC resonant circuit. Commonly, in an LLC converter a controller controls a switch drive signal to a power stage so that switches undergo zero-voltage switching.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
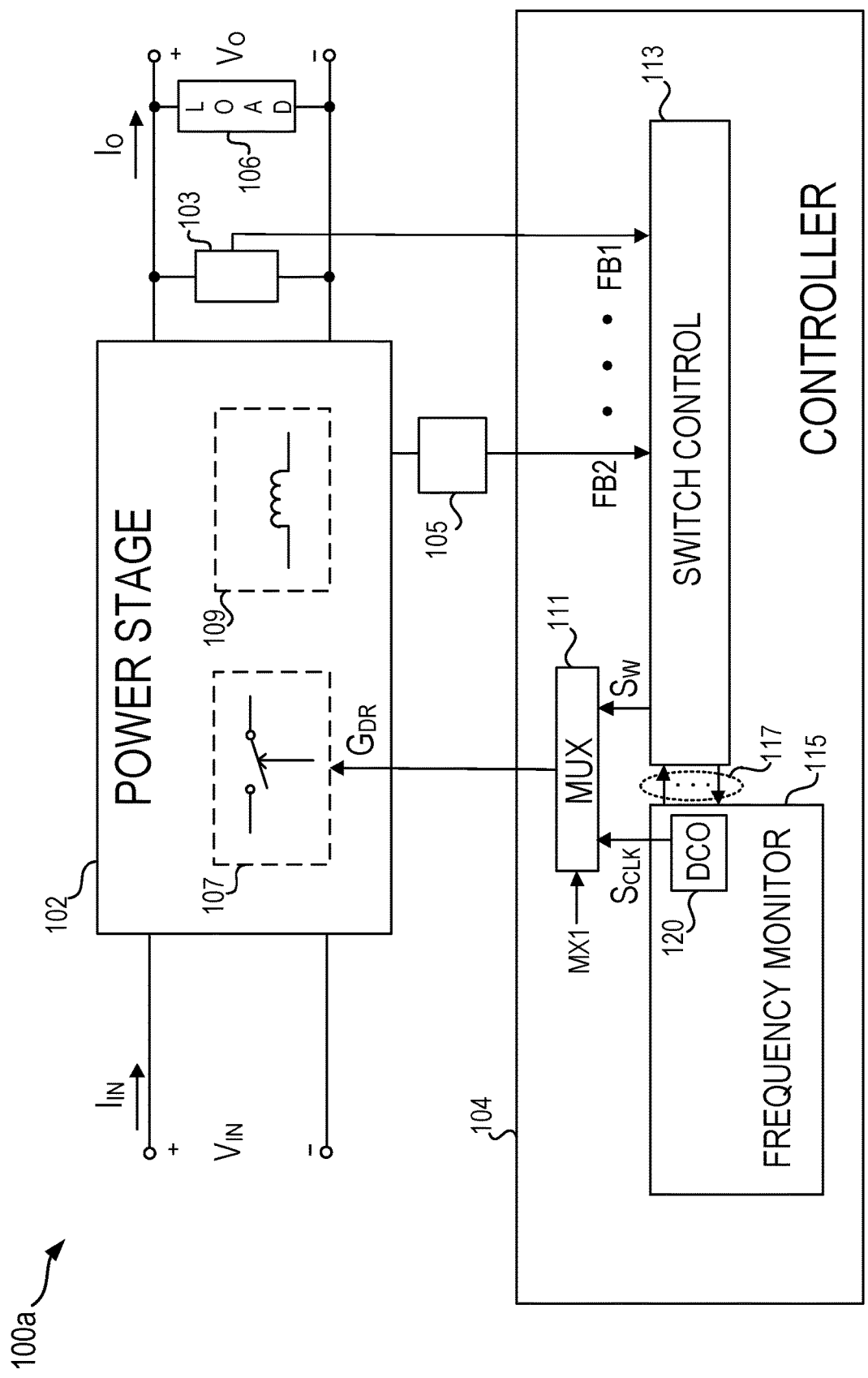
FIG. 1A illustrates an example switching power converter for delivering output power to a load according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of controlling a switch drive signal following mode transitions in a switching power converter. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of controlling a switch drive signal following mode transitions in a switching power converter. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or integrated circuit (IC) are defined or measured.

Switching power converters can be classified in terms of a switching power converter topology. Switching power converter topologies include buck, boost, flyback, and buck-boost, to name a few. Each topology may be further classified in terms of a power stage and a controller. The power stage typically includes one or more switches and filter components (i.e., capacitors and inductors) configured to transfer power in response to one or more switch drive signals (e.g., a gate drive signal) from the controller. The controller may include a switch control module with feedback loops configured to regulate output power to a load by adjusting parameters of the switch drive signal in response to operating conditions. For instance, the controller may be configured to control duty cycle, switching frequency, or a combination of both duty cycle and switching frequency. Additionally, the switching frequency and/or duty cycle may be adjusted in response to variations in applied input power and/or variations in the output load.

As mentioned above one type of switching power converter is a resonant converter which uses a resonant circuit, also referred to as a "tank" circuit, having inductance and capacitance as part of the power stage. Resonant converters may have some advantages compared to non-resonant switching power converters, such as operating at higher switching frequencies with soft switching (e.g., zero-voltage switching). By way of example, zero-voltage switching (ZVS) is a type of soft switching characterized by the turn-on and turn-off transitions of a switch (e.g., a power field effect transistor (FET) or semiconductor device) occurring at, or near, zero crossings of a tank circuit waveform. In this way a voltage across the switch (e.g., a power FET drain-to-source voltage), can be zero, or substantially zero during switching transitions, thereby reducing switching losses. Using soft switching can advantageously reduce packaging and component costs by allowing the use of smaller magnetic elements and smaller EMI filters.

In an LLC converter, and in switch mode power converters, typically the switch drive signal may originate from a switch control module during steady state operation. Also, the mode in which the switch drive signal is delivered may depend upon system variables and output load. For instance, during nominal load conditions, the switch control module may operate in a continuous conduction mode to control a continuous substantially constant frequency switch drive signal. In this regard, continuous conduction mode may also be referred to as a continuous switching mode. Alternatively, during light and/or no load conditions, the switch control module may operate in a discontinuous mode.

In some topologies, the discontinuous mode of operation may be characterized by a burst mode. During burst mode, a switch mode power converter, and an LLC converter, may switch at a fixed frequency for short durations as necessary to maintain an output voltage level. These short durations of switching may be referred to as "burst-on" periods or burst-on intervals. Between the short durations, the switching may be inhibited and controller circuits may be temporarily disabled to reduce power consumption. These durations of inhibiting switching may be referred to as "burst-off" periods or burst-off intervals. Control of switching in this manner, where there are transitions or abrupt transitions in frequency in a switch mode power stage, is often referred to as "burst" and/or "burst mode".

In switch mode power converters, and in LLC converters, using the switch control module as the source for controlling switch drive signals during switching frequency transitions can become problematic. For instance, the controller may typically use analog and/or mixed signal circuits to realize control circuits and control loop circuits. During the period while the switch drive signal is inhibited and while the analog and/or mixed signal circuits are disabled to reduce power consumption, the analog and/or mixed signal circuits (i.e., the control circuits and control loop circuits) may functionally forget (i.e., not be able to hold) the switching frequency just prior to the transition. This transition switching frequency may be an end-of-mode frequency associated with a signal frequency prior to the end of one mode and the beginning of another mode. Analog circuits that do not recall the transition switching frequency when they subsequently become enabled may suffer poor dynamic performance as a consequence.

Apparatus and methods for controlling a switch drive signal following mode transitions in a switching power converter are disclosed herein. An example controller includes a frequency monitor module for monitoring characteristics of a switch drive signal during different modes of operation. In one mode of operation the switch drive signal may originate from the switch control module while the frequency monitor module monitors the switching frequency. The frequency monitor module can save and recall a transition frequency using digital circuitry; and in another mode of operation the switch drive signal may originate from a digitally controlled oscillator (DCO) within the frequency monitor module.

FIG. 1A illustrates a switching power converter 100a for delivering output power to a load 106 according to the teachings herein. The switching power converter 100a includes a power stage 102, a controller 104, a feedback network 103, and a feedback network 105. The power stage 102 includes a switches block 107 and filter components 109. The controller includes a switch control module 113, a frequency monitor module 115, and a multiplexer 111; additionally, the frequency monitor module 115 includes a digitally controlled oscillator (DCO) 120.

During operation, the switching power converter 100a may convert input power (i.e., input voltage $V_{IN}$ and input current $I_{IN}$) from the power stage input into regulated output power (i.e., output voltage $V_O$ and output current $I_O$). As illustrated the switching power converter 100a may receive input power from a direct current (dc) input voltage $V_{IN}$; the input power may then be converted and provided to the load 106 at the power stage output with a regulated dc output voltage $V_O$. The power stage may use one or more switches in the switches block 107 with the filter components 109 to switch the input power and provide regulated output power.

The controller 104 may generate and/or control a switch drive signal $G_{DR}$ to the switches block 107 based on feedback signal FB1 and feedback signal FB2 provided from the feedback network 103 and feedback network 105, respectively. The feedback networks 103 and 105 may sample power stage signals including the output voltage $V_O$, output current $I_O$, a switch current and/or switch voltage from the switches block 107, a filter current and/or voltage from the filter components 109, and the like. For instance, the feedback network 103 may sample the output voltage $V_O$ to provide feedback signal FB1; the controller 104 may use it in a voltage control loop for controlling the switch drive signal $G_{DR}$. Alternatively, and additionally, the feedback network 105 may sample a primary signal such as a switching signal (e.g., a switching current) in the power stage to provide feedback signal FB2; and the controller 104 may also use it in a current control loop for controlling the switch drive signal $G_{DR}$.

According to the teachings herein the switching power converter 100a may operate in and transition among modes including, but not limited to, a burst mode, a continuous switching mode, and a startup mode. During operation, the frequency monitor module 115 may monitor and remember a signal characteristic (e.g., frequency and/or duty cycle) of the switch drive signal $G_{DR}$. During transitions between modes and/or during periods when the switch control module 113 temporarily loses functional control, the controller 104 may use the frequency monitor module 115 to recall the signal characteristic and to control the switch drive signal $G_{DR}$ while the switch control module 113 regains control.

For instance, during continuous switching mode and during time periods when control circuits and/or control loop circuits of the switch control module 113 are functional, the controller 104 may use the switch control module 113 to generate the switch signal $S_W$ while the frequency monitor module 115 monitors a frequency of the switch signal $S_W$. In this regard the frequency monitor module 115 may operate in a slave state (i.e., as a slave). Accordingly, the controller 104 may exert a control signal MX1 at the multiplexer 111 to select switch signal $S_W$. While the frequency monitor module 115 operates as a slave, it may monitor and store signal characteristics (e.g., a frequency and/or a duty cycle) of the switch signal $S_W$.

Also, during burst mode and/or during time periods when control circuits and/or control loop circuits within switch control module 113 are in a standby state (e.g., low-power state) or are transitioning from standby, the controller 104 may use the frequency monitor module 115 to provide a substitute for the switch signal $S_W$. For instance, the frequency monitor module 115 may use the DCO 120 to provide a DCO clock signal $S_{CLK}$ to the multiplexer 111. The DCO clock signal $S_{CLK}$ may advantageously comprise and recall signal characteristics (e.g., frequency) of the switch signal $S_W$ so that the switching power converter 100a operates with enhanced dynamic performance. Accordingly, the controller 104 may exert a control signal MX1 to select the DCO clock signal $S_{CLK}$ so that the frequency monitor module 115 operates as master (i.e., in a master state); in this way the switch drive signal $G_{DR}$ may originate from the frequency monitor module 115. Thus, in the master state the frequency monitor module 115 may control the switch drive signal $G_{DR}$.

According to the teachings herein, the controller 104 may use the frequency monitor module 115 to temporarily operate as master while the switch control module 113 wakes up from a standby state. Once the switch control module 113 regains functional control, the controller 104 may exert the control signal MX1 to select the switch signal $S_W$ and to operate the frequency monitor module 115 as a slave.

As illustrated, the frequency monitor module 115 may send and/or receive one or more inter-stage signals 117 with the switch control module 113 in order to enhance control and/or to determine how to provide the DCO clock signal $S_{CLK}$. For instance, inter-stage signals 117 may provide power output information from one or more of the feedback signals FB1, FB2 to the frequency monitor module 115. In response to one or more of the feedback signals FB1, FB2, the frequency monitor module 115 may adjust a parameter (e.g., a frequency value) of the DCO clock signal $S_{CLK}$.

Although the switching power converter 100a illustrates an embodiment including two feedback networks 103, 105, other configurations having greater or fewer feedback networks to provide greater or fewer than two feedback signals FB1, FB2 are possible. For instance, in some embodiments a switching power converter 100a may be configured for voltage mode control and may use just feedback network 103 to provide feedback signal FB1 to the controller 104. Additionally, in some embodiments the controller 104 may provide more than just one switch drive signal $G_{DR}$; and as described below in regard to FIG. 1B, a switching power converter may use more than just one controller 104.

Figure 1B:
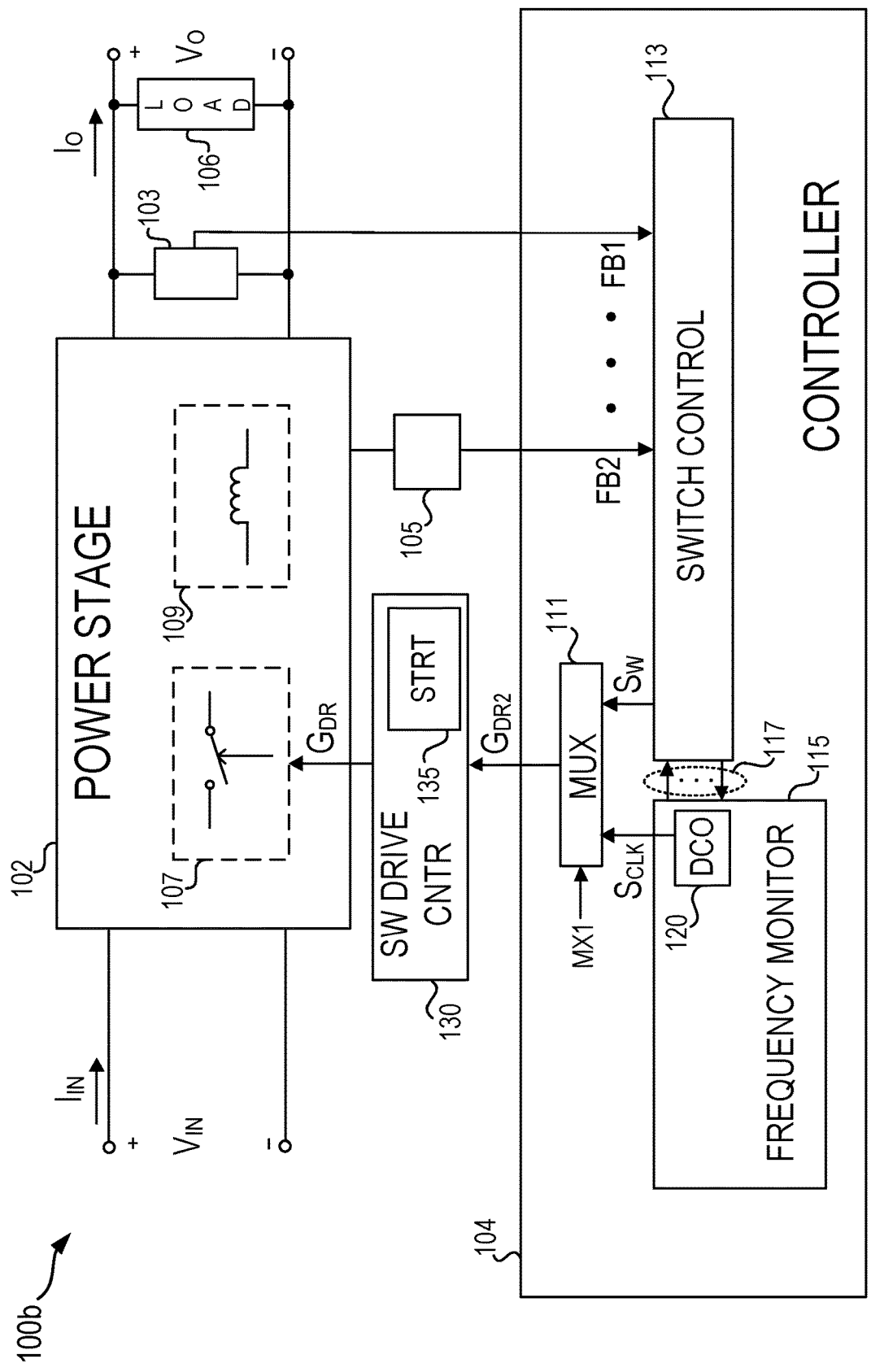
FIG. 1B illustrates another example switching power converter for delivering output power to a load according to another embodiment.

FIG. 1B illustrates a switching power converter 100b for delivering output power to a load 106 according to another embodiment. The switching power converter 100b is similar to the switching power converter 100a except it includes a switch drive controller 130. Additionally, the switch drive controller 130 includes startup control circuit 135.

The switch drive controller 130 may operate as a supplemental and/or intermediate controller between the controller 104 and the power stage 102 to provide the switch drive signal $G_{DR}$ based upon a switch drive signal $G_{DR2}$ from the controller 104. For instance, the switch drive controller 130 may level shift the switch drive signal $G_{DR2}$ to a common mode range relative to a ground potential separate from that of the controller 104.

Additionally, the switch drive controller 130 may provide the switch drive signal $G_{DR}$ during periods when the switch drive signal $G_{DR2}$ becomes unavailable. For instance, during startup mode (i.e., startup), control loop circuits and circuits within the controller 104 may not have sufficient power to operate. Under these circumstances the switch drive controller 130 may use the startup control circuit 135 to provide the switch drive signal $G_{DR}$ until the controller 104 attains sufficient power to provide the switch drive signal $G_{DR2}$. In this way the switch drive controller 130 may control the switch drive signal $G_{DR}$ during a first, primary mode of startup until control is handed over to the controller 104.

For instance, during startup while circuits and control loop circuits of the switch control module 113 receive insufficient power to operate, the startup control circuit 135 may control the switch drive signal $G_{DR}$. Eventually the switch control module 113 may receive enough power to become operable and the switch drive controller 130 may handover control to the controller 104. As described below, prior to the handover transition (i.e., the handover time), the frequency monitor module 115 may operate as a slave and monitor switching frequency by monitoring one or more of the inter-stage signals 117; and at handover the frequency monitor module 115 may store a handover frequency (i.e., the end-of-mode frequency just prior handover) at the end of the primary mode.

According to the teachings herein, at handover the controller 104 may use the frequency monitor module 115 to recall the handover frequency and to operate as master providing the DCO clock signal $S_{CLK}$. In this way the frequency monitor module 115 provides the switch drive signal $G_{DR2}$ to control the switch drive signal $G_{DR}$ for an initial period following handover into a secondary mode. During the secondary mode of startup and after the initial period following handover, the switch control module 113 may gain control of switch drive signal $G_{DR}$ by generating the switch signal $S_W$; also during the secondary mode of startup, the frequency monitor module 115 may operate as slave and monitor the switch signal $S_W$.

Figure 2A:
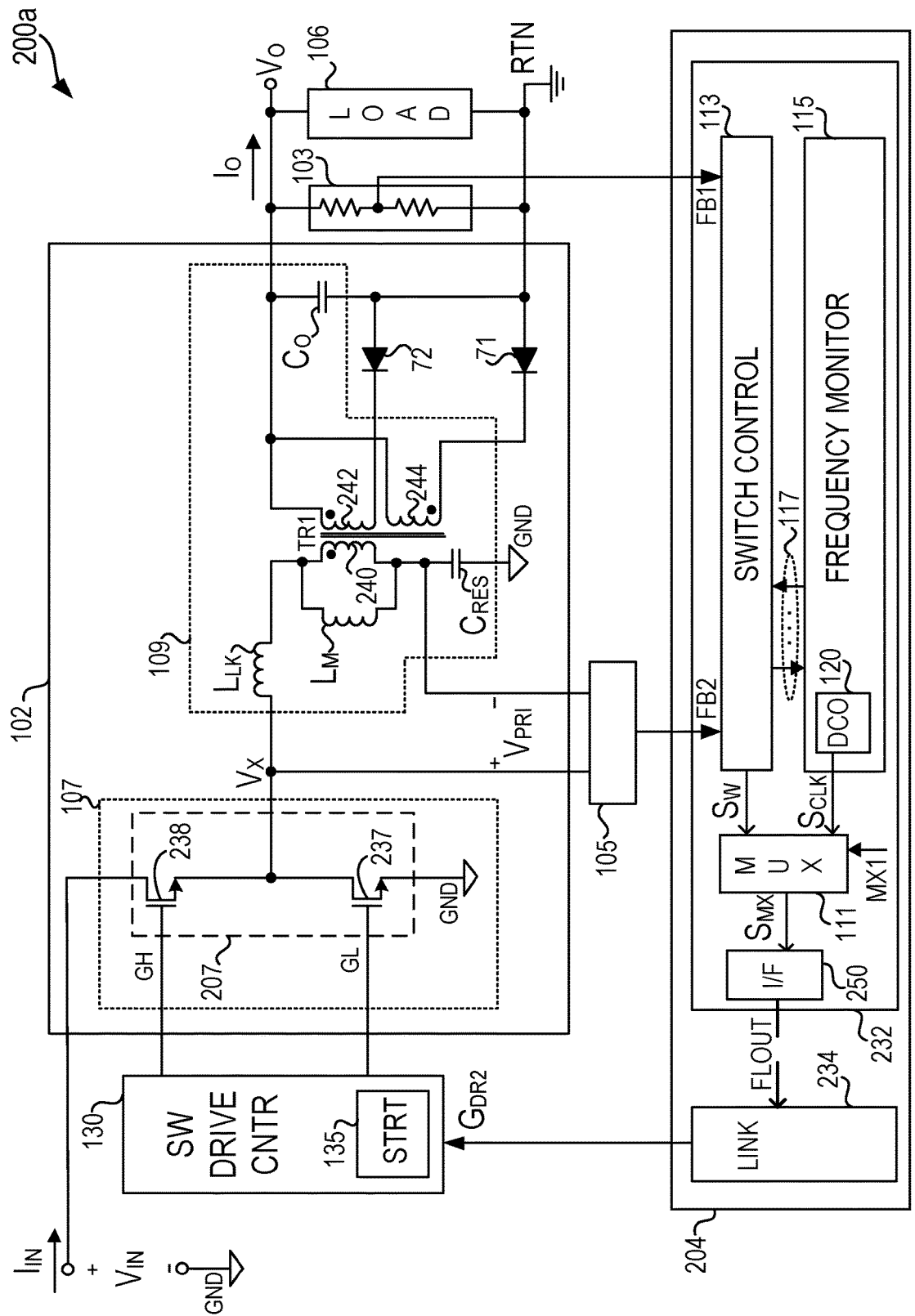
FIG. 2A illustrates an example LLC converter for providing output power to a load according to an embodiment.

FIG. 2A illustrates an LLC converter 200a for controlling output power to a load 106 according to an embodiment. The LLC converter 200a realizes a switching power converter 100b with a power stage 102, a controller 204, and a switch drive controller 130. The power stage 102 is coupled between an input of the LLC converter 200a and an output of the LLC converter 200a and includes the switches block 107, the filter components 109, and rectifiers 71-72 for realizing a resonant converter power stage. The switches block 107 is coupled to the input of the LLC converter 200a and to an input of energy transfer element TR1 of filters component 109, and includes a half bridge 207 with a high-side (HS) device 238 and a low-side (LS) device 237, realized using N-channel power field effect transistors (NFETs).

The switch drive controller 130 may operate as a primary side controller to receive the switch drive signal $G_{DR2}$ from the controller 204; and in response it may provide a switch drive signal GH to switch the HS device 238 and a switch drive signal GL to switch the LS device 237. In this way the switches block 107 may provide a switched power signal $V_X$ to an input of the filter components 109 to control a transfer of energy from the input of the resonant power converter 200a to the output of the resonant power converter 200a.

The filter components 109 include a leakage inductor $L_{LK}$, a magnetizing inductor $L_M$, a resonant capacitor $C_{RES}$, energy transfer element TR1, which in the depicted example includes a primary transformer winding 240, a secondary transformer winding 242, and a secondary transformer winding 244, as well as an output capacitor $C_O$. The leakage inductor $L_{LK}$, the magnetizing inductor $L_M$, and the resonant capacitor $C_{RES}$ are connected in series to form a series resonant tank circuit. The primary transformer winding 240 is galvanically isolated from the secondary transformer windings 242, 244 of energy transfer element TR1 so that the input of the power stage 102 may be isolated from the output of the power stage 102. In this way the dc input voltage $V_{IN}$ may be referenced to ground GND and a regulated dc output voltage $V_O$ may be referenced to a secondary ground RTN.

As illustrated the feedback signal FB1 may be derived from a resistor divider feedback network 103; and the feedback signal FB2 may be derived from a feedback network 105 coupled in parallel with the series connected magnetizing inductor $L_M$ and leakage inductor $L_{LK}$. The feedback network 105 may be coupled to the primary side to of the LLC converter 200a as shown to provide the feedback signal FB2 as a buffered primary port signal proportional to a primary signal such as the primary port signal VPRI of the power stage 102. During continuous switching (e.g., nominal load conditions) the LLC converter may operate so that a switching frequency of the switch drive signals GH, GL, $G_{DR2}$ is greater than a resonant frequency of the series resonant tank circuit formed by the leakage inductor $L_{LK}$, the magnetizing inductor $L_M$, and the resonant capacitor $C_{RES}$. In this way the HS device 238 and/or LS device 237 may undergo zero voltage switching (ZVS).

As illustrated, controller 204 includes a secondary control block 232 and a link circuit 234. The secondary control block 232 may operate at voltages relative to the secondary ground RTN and may communicate control information (e.g., information relating to the switch drive signal $G_{DR2}$) via a linking signal FLOUT. The linking signal FLOUT may be transmitted by an opto-coupler, capacitive coupler, inductive interface, and/or a magnetic interface so as to galvanically isolate the switch drive signal $G_{DR2}$ from signals of the secondary control block 232. In this way the switch drive signal $G_{DR2}$ may be referenced to ground GND and may be provided to the switch drive controller 130 at the primary side of the LLC converter 200a.

The secondary control block 232 includes the switch control module 113, the frequency monitor module 115, the multiplexer 111, and an interface circuit 250. The interface circuit 250 may be coupled to an output of the multiplexer 111 and transmit the signal $S_{MX}$ via the linking signal FLOUT. The signal $S_{MX}$ may be referenced to the secondary ground RTN and may include the control information relating to the switch drive signal $G_{DR2}$. Additionally, in some embodiments the switch drive signal $G_{DR2}$ may be delayed with respect to the switch signal $S_W$ and level shifted to a voltage range (e.g., a primary side voltage range) referenced to ground GND.

Figure 2B:
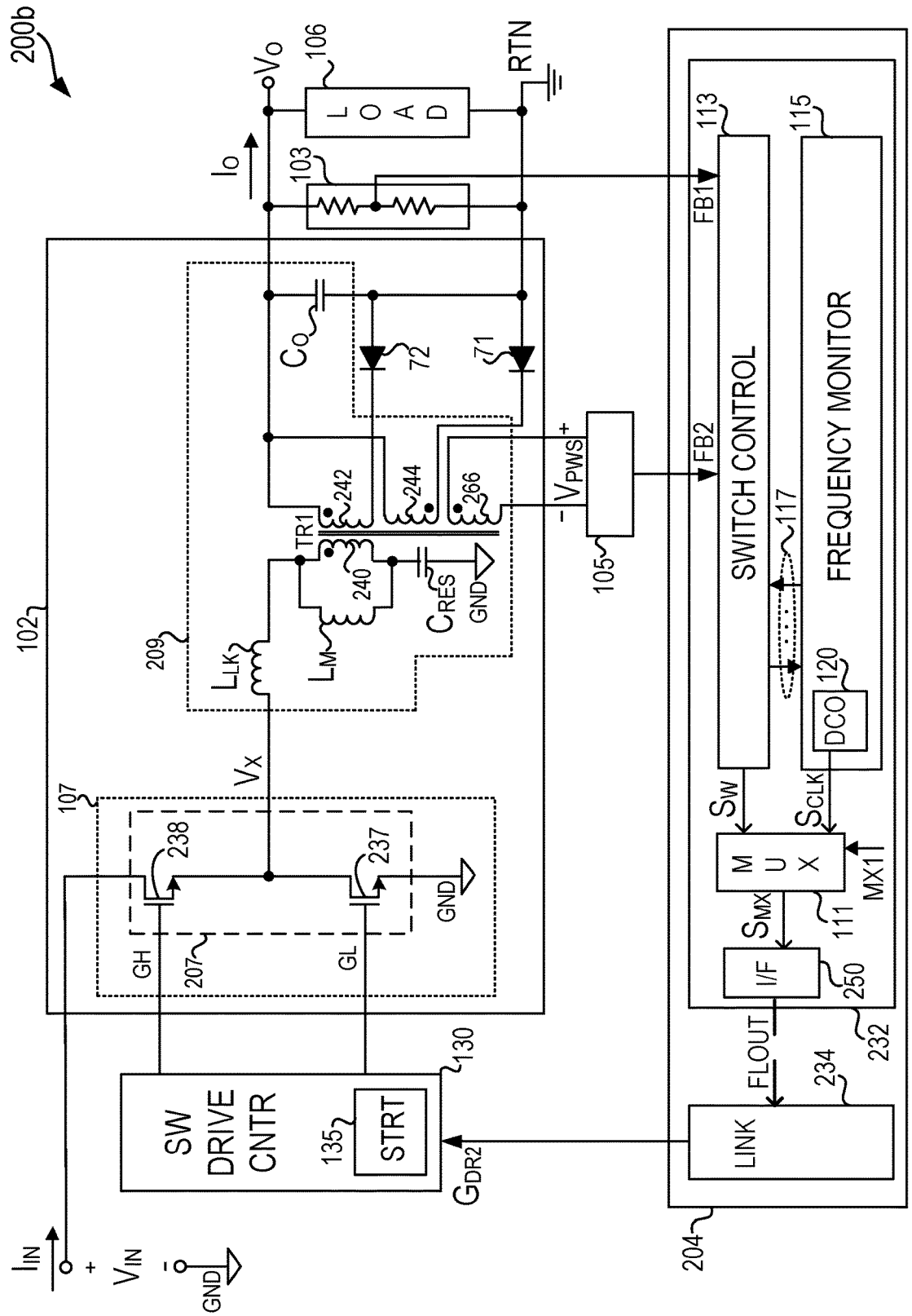
FIG. 2B illustrates another example LLC converter for providing output power to a load according to another embodiment.

FIG. 2B illustrates an LLC converter 200b for controlling output power to a load 106 according to another embodiment. The LLC converter 200b is similar to LLC converter 200a except it uses filter components 209 and provides a primary port signal $V_{PWS}$ from a magnetically coupled winding 266. The filter components 209 are similar to filter components 109 except for the additional coupled winding 266. The coupled winding 266 may be coupled across (i.e., in parallel with) the series coupled leakage inductor $L_{LK}$ and the magnetizing inductor $L_M$. In this way the primary port signal $V_{PWS}$ may comprise signal content similar to that of the primary port signal $V_{PRI}$ of FIG. 2A; and as illustrated, the primary port signal $V_{PWS}$ may be provided to the feedback network 105 to derive the feedback signal FB2.

Figure 3:
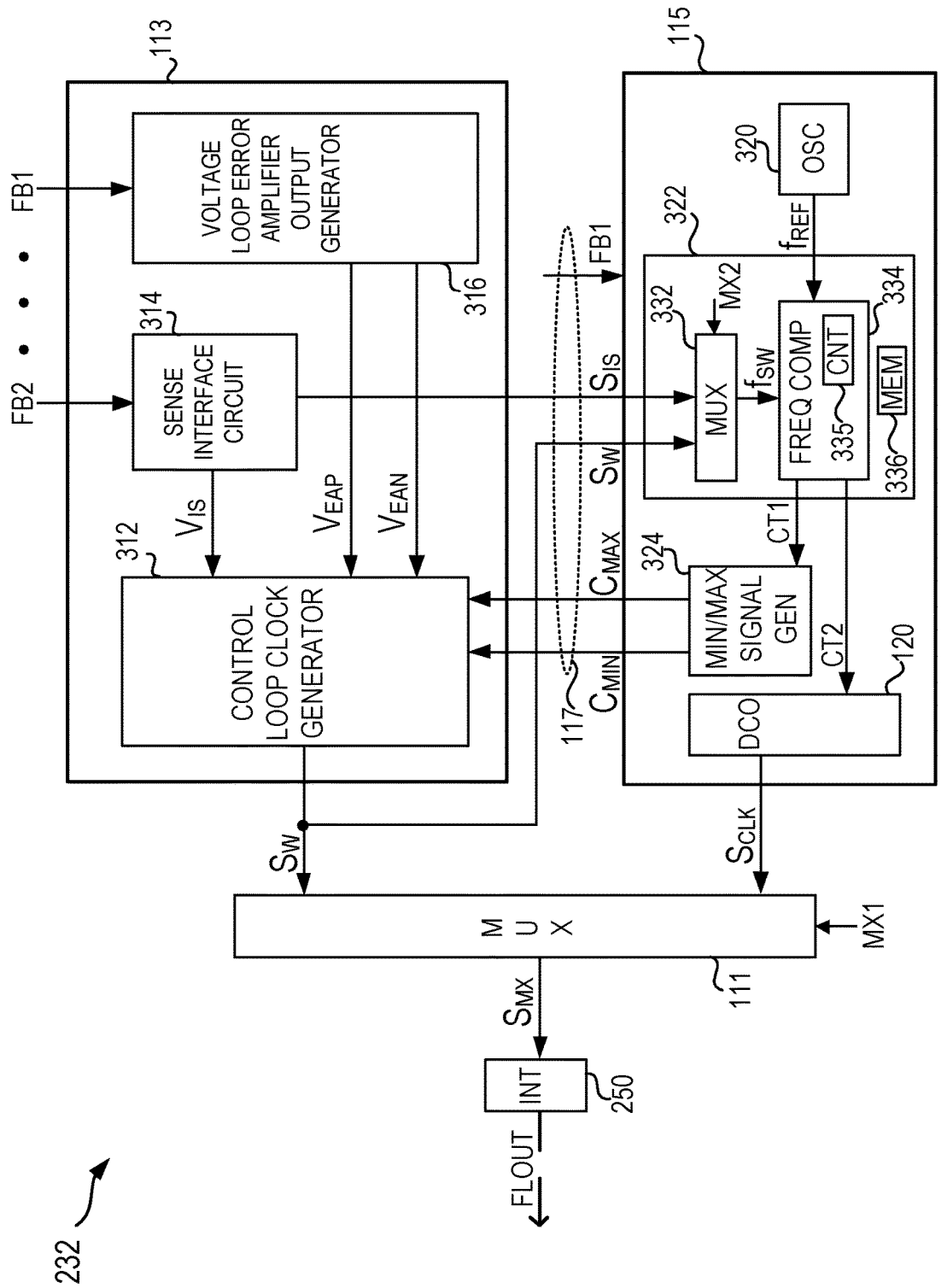
FIG. 3 illustrates an example secondary control block according to an embodiment.

FIG. 3 illustrates a secondary control block 232 according to an embodiment. The secondary control block 232 includes the switch control module 113, the frequency monitor module 115, and the multiplexer 111. As illustrated, inter-stage signals 117, transferred between the switch control module 113 and the frequency monitor module 115, may include clock limit signals $C_{MIN}$, $C_{MAX}$, the switch signal $S_W$, a sense interface signal $S_{IS}$, and the feedback signal FB1.

The clock limit signals $C_{MIN}$, $C_{MAX}$ may be used by the switch control module 113 to limit a minimum and maximum signal characteristic. For instance, the clock limit signal $C_{MIN}$ may be used to limit a minimum switching cycle period (i.e., to limit a maximum frequency); and the clock limit signal $C_{MAX}$ may be used to limit a maximum switching cycle period (i.e., to limit a minimum frequency).

Depending upon a mode of operation (e.g., startup mode), the frequency monitor module 115 may use the sense interface signal $S_{IS}$ and/or the switch signal $S_W$ to monitor the frequency of the switch drive signal $G_{DR2}$. The sense interface signal $S_{IS}$ and the switch signal $S_W$ may advantageously provide the signal characteristics (e.g., switching frequency) of the switch drive signal $G_{DR2}$ but level shifted to a common mode signal range of the secondary control block 232.

As illustrated, the switch control module 113 receives feedback signals FB1, FB2 and the clock limit signals $C_{MIN}$, $C_{MAX}$; and it provides the switch signal $S_W$ and the sense interface signal $S_{IS}$. Additionally, the frequency monitor module 115 receives the switch signal $S_W$ and the sense interface signal $S_{IS}$; and it provides the DCO clock signal $S_{CLK}$ and the clock limit signals $C_{MIN}$, $C_{MAX}$. The multiplexer 111 may use the control signal MX1 to select either the switch signal $S_W$ or the DCO clock signal $S_{CLK}$ to provide the signal $S_{MX}$. Signal $S_{MX}$ may, in turn, be coupled to the link circuit 234 through interface circuit 250 to provide the switch drive signal $G_{DR}$.

The switch control module 113 includes a control loop clock generator 312, a sense interface circuit 314, and a voltage loop error amplifier output generator 316. The voltage loop error amplifier output generator 316 receives the feedback signal FB1 and provides an error amplifier output signal $V_{EAP}$ and a complementary error amplifier output signal $V_{EAN}$. The sense interface circuit 314 receives the feedback signal FB2. In response to the feedback signal FB2, the sense interface circuit 314 provides a sense interface signal $V_{IS}$ and a sense interface signal $S_{IS}$. The control loop clock generator receives the sense interface signal $V_{IS}$, the error amplifier output signal $V_{EAP}$, the complementary error amplifier output signal $V_{EAN}$, and the clock limit signals $C_{MIN}$, $C_{MAX}$.

During continuous switching mode the control loop clock generator 312 may generate the switch signal $S_W$ based on the sense interface signal $V_{IS}$, the error amplifier output signal $V_{EAP}$, and the complementary error amplifier output signal $V_{EAN}$. The switch signal $S_W$ may be selected by the multiplexer 111 so that the switch drive signal $G_{DR2}$ is provided to the switch drive controller 130. As discussed above, the switch drive signal $G_{DR2}$ may be delayed with respect to the switch signal $S_W$ and level shifted to a voltage range referenced to ground GND.

The control loop clock generator 312, sense interface circuit 314, and voltage loop error amplifier output generator 316 may be realized using analog, mixed signal, and or digital circuits. During continuous switching mode, analog and mixed signal circuits may dissipate power due to switching and/or dc biasing; and during other operational modes including light load (e.g., burst mode) analog and mixed signal circuits may be operated in standby to reduce power dissipation. In transitioning from standby to an enabled state the control loop clock generator 312, sense interface circuit 314, and/or voltage loop error amplifier output generator 316 may require a period of time (e.g., a wakeup time) to become operable.

Although FIG. 3 shows a switch control module 113 for use in a secondary control block 232, other switch control modules having greater or fewer circuits are possible. For instance, as one of ordinary skill in the art can appreciate, other switching power converter topologies may use a simpler and/or more complex switch control module 113 to generate a switch signal $S_W$.

Also as illustrated, the frequency monitor module 115 includes the DCO 120, a frequency reference oscillator 320, a frequency detector 322, and a signal limit generator 324. The frequency detector 322 includes a multiplexer 332 and a frequency comparator circuit 334. The frequency comparator circuit 334 includes a counter 335.

While operating as a slave, the frequency monitor module 115 may use either the switch signal $S_W$ or the sense interface signal $S_{IS}$ to estimate a characteristic (e.g., frequency) of the switch drive signals $G_{DR2}$, GH, GL. The multiplexer 332 may select either the switch signal $S_W$ or the sense interface signal $S_{IS}$ using a control signal MX2 and provide it (i.e., signal $f_{SW}$) to frequency comparator circuit 334. The frequency comparator circuit 334 may compare the signal $f_{SW}$ with a reference oscillator signal $f_{REF}$ from the frequency reference oscillator 320 to estimate the characteristic (e.g. frequency). In some embodiments the reference oscillator signal $f_{REF}$ can have a frequency (e.g., 10 MHz) greater than a frequency (e.g., 200 KHz) of the switch drive signals $G_{DR2}$, GH, GL; and the counter 335 may be used to estimate a signal period of signal $f_{SW}$. For instance, the counter 335 may estimate the switching frequency, and consequently the signal period of the switch drive signals GDR2, GH, and GL, by counting a number of switching cycles of the reference oscillator signal $f_{REF}$ relative to a number of switching cycles of the signal $f_{SW}$. In other examples, other configurations using a phase locked loop instead of the frequency comparator circuit 334 may also be possible.

The frequency comparator circuit 334 may provide a control signal CT1 to the signal limit generator 324 and a control signal CT2 to the DCO 120. The signal limit generator 324 may use the control signal CT1 to determine and/or calculate values of the clock limit signals $C_{MIN}$, $C_{MAX}$ coupled to be received by switch control 113. Additionally, the DCO may use the control signal CT2 to modulate the frequency of the DCO clock signal $S_{CLK}$.

The frequency monitor module 115 may store and recall a signal characteristic (e.g., frequency) using a memory register, such as a digital memory 336. For instance, in one example frequency monitor module 115 may include digital memory 336 in frequency detector 322 to store the signal characteristic (e.g., frequency) as shown, or in another example, the DCO 120, signal limit generator 324, and/or frequency detector 322 may include digital memory 336 to recall values of the control signals CT1 and CT2. The frequency monitor module 115 may also use the feedback signal FB1 to determine a loading condition prior to operating as master. Depending on the value of the feedback signal FB1, the frequency monitor module 115 may adjust a frequency of the DCO clock signal $S_{CLK}$ in order to respond to a higher load demand (i.e., a higher output current $I_O$).

Additionally, as described above regarding FIG. 2B, during startup, the switch signal $S_W$ may be unavailable in the secondary control block 232; and the switch drive controller 130 may use the startup control circuit 135 to generate the switch drive signals GH and GL. Accordingly, the frequency detector 322 may use the multiplexer 332 using control signal MX2 to select the sense interface signal $S_{IS}$ to estimate switching frequency.

During startup at handover, the control loop clock generator 312, sense interface circuit 314, and/or voltage loop error amplifier output generator 316 may require a period of time (e.g., a wakeup time) to become operable. Accordingly, at handover the frequency monitor module 115 may operate as master and use the multiplexer 111 using control signal MX1 to select the DCO clock signal $S_{CLK}$.

Figure 4:
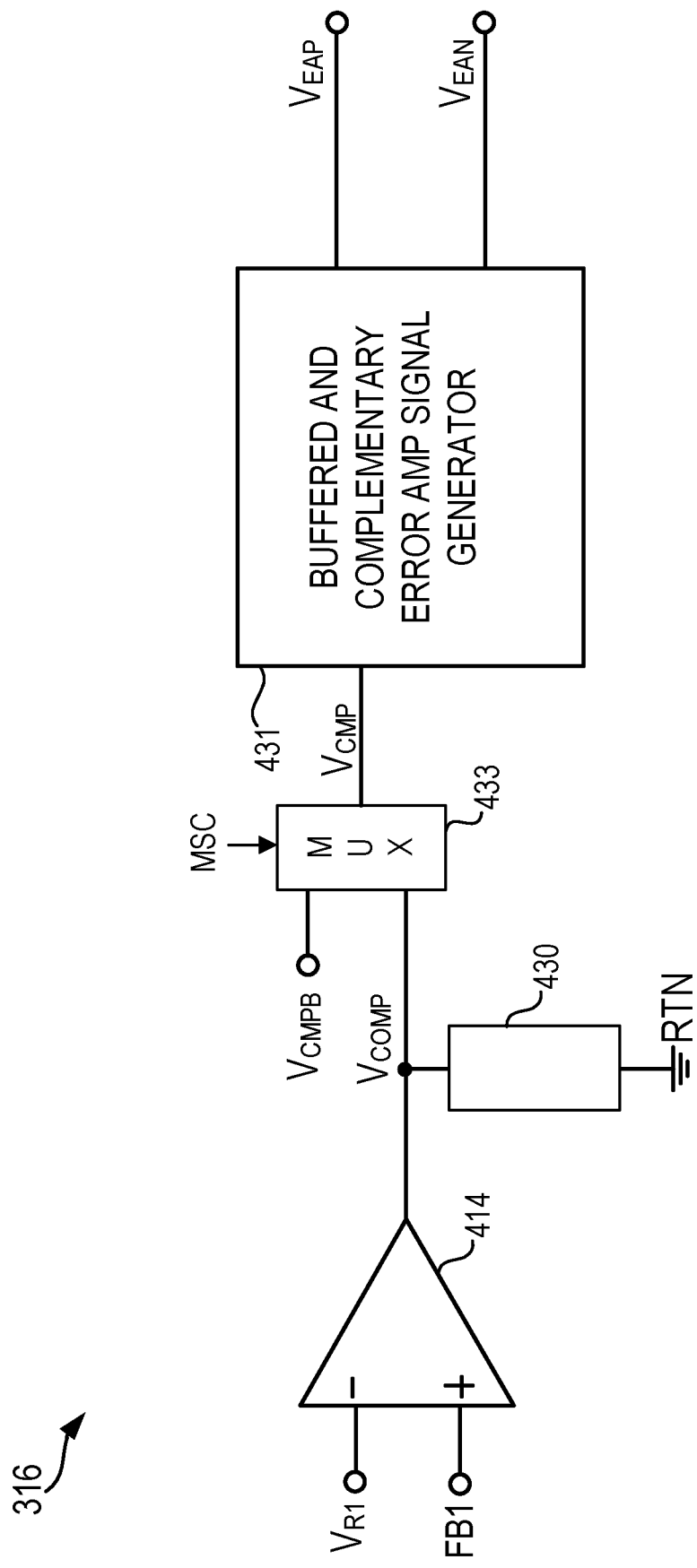
FIG. 4 illustrates an example voltage loop error amplifier output generator according to an embodiment.

FIG. 4 illustrates a voltage loop error amplifier output generator 316 according to an embodiment. The voltage loop error amplifier output generator 316 includes an operational amplifier 414, a compensation network 430, a multiplexer 433, and a complementary signal generator 431. The operational amplifier 414 receives the feedback signal FB1 at its noninverting input and a reference signal $V_{R1}$ at its inverting input. As part of a voltage control loop (i.e., a negative feedback loop) in an LLC converter 200a or 200b, the operational amplifier 414 may provide the compensated voltage $V_{COMP}$ at its output so as to reduce the difference between the feedback signal FB1 and the reference signal $V_{R1}$. For instance, the feedback signal FB1 may be a voltage derived from a feedback network 103 which samples output voltage $V_O$; the compensated voltage $V_{COMP}$ may approach a steady state value causing the feedback signal FB1 to approach a voltage value of the reference signal $V_{R1}$. The compensation network 430 may include passive components (e.g., capacitors and resistors) to stabilize the compensated voltage $V_{COMP}$.

The multiplexer 433 receives the compensated voltage $V_{COMP}$ and a fixed voltage $V_{CMPB}$. In some embodiments the fixed voltage $V_{CMPB}$ may be adjusted by an operating condition of the LLC converter (e.g., LLC converter 200a and/or 200b). For instance, the fixed voltage $V_{CMPB}$ may be a function of the input voltage $V_{IN}$. Also, as illustrated, the complementary signal generator 431 receives the multiplexer output voltage $V_{CMP}$ and generates the error amplifier output voltage $V_{EAP}$ and the complementary error amplifier output voltage $V_{EAN}$ based on the value of the multiplexer output voltage $V_{CMP}$.

Under continuous switching mode the control signal MSC may be applied to the multiplexer 433 so that the multiplexer output voltage $V_{CMP}$ is the compensated voltage $V_{COMP}$ (i.e., the multiplexer 433 selects $V_{COMP}$). In this way, the error amplifier and complementary error amplifier output voltages $V_{EAP}$, $V_{EAN}$ may vary with the compensated voltage $V_{COMP}$, and thus, to changes in the feedback signal FB1. As the load 106 and the output current $I_O$ decrease, the compensated voltage $V_{COMP}$ may increase.

Eventually the load 106 may decrease and reach a light load condition (i.e., burst mode). In burst mode, the control signal MSC may be applied to the multiplexer 433 to select the voltage $V_{CMPB}$. In this way the error amplifier and complementary error amplifier output voltages $V_{EAP}$, $V_{EAN}$ may be fixed voltages proportional to voltage $V_{CMPB}$.

Although FIG. 4 shows an embodiment of a voltage loop error amplifier output generator 316 configured to generate an error amplifier and complementary error amplifier output voltage $V_{EAP}$, $V_{EAN}$, other configurations are possible. For instance, in a buck topology, a voltage loop error amplifier output generator 316 may use an operational amplifier with a feedback signal FB1 connected to an inverting input instead of a noninverting input.

Figure 5A:
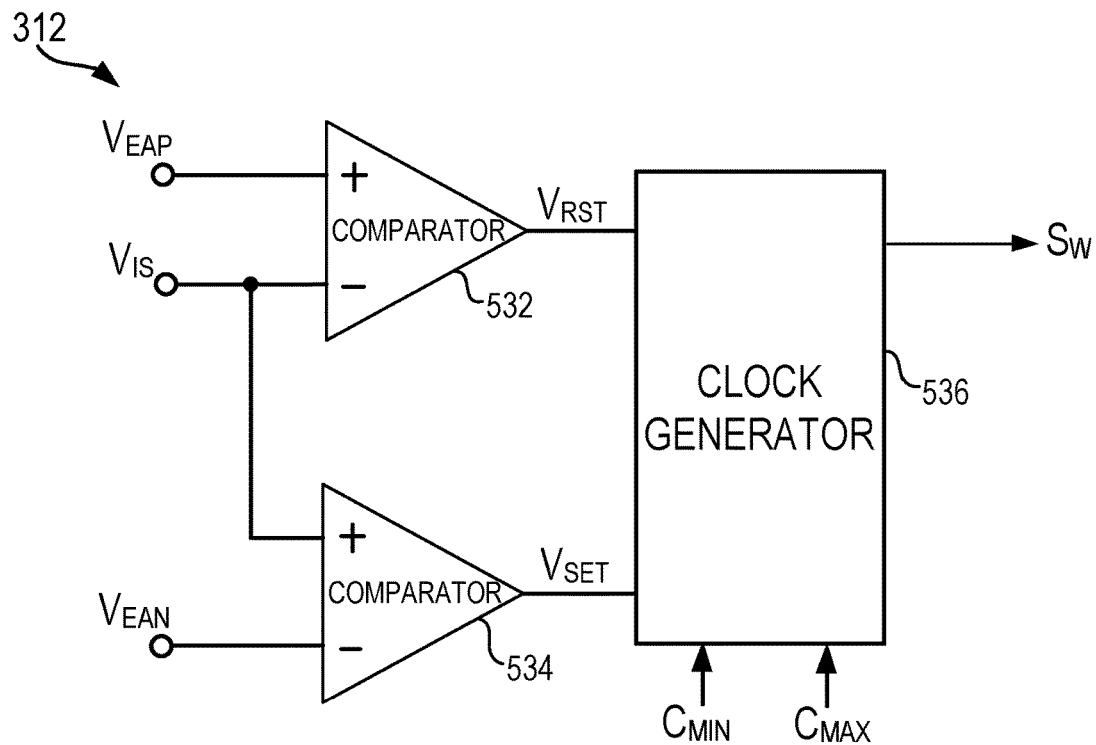
FIG. 5A illustrates an example control loop clock generator according to an embodiment.
Figure 5B:
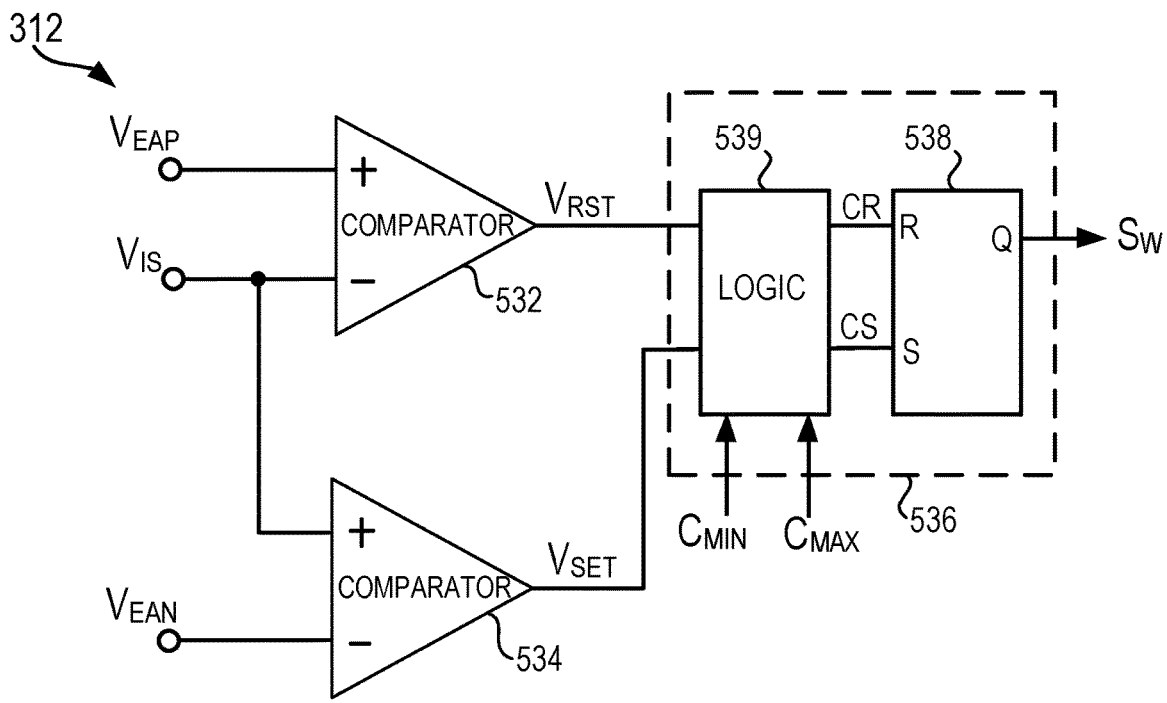
FIG. 5B illustrates additional features of the example control loop clock generator according to the embodiment of FIG. 5A.

FIG. 5A illustrates a control loop clock generator 312 according to an embodiment; and FIG. 5B illustrates additional features of the control loop clock generator 312 according to the embodiment of FIG. 5A. The control loop clock generator 312 includes a comparator 532, a comparator 534, and a clock generator 536. The control loop clock generator 312 receives the error amplifier and the complementary error amplifier output signals $V_{EAP}$, $V_{EAN}$ and compares them with the sense interface signal $V_{IS}$ using comparators 532 and 534. As will be shown below, the sense interface signal $V_{IS}$ may be a voltage signal which is representative of a primary signal such as primary port signal $V_{PRI}$ and/or primary port signal $V_{PWS}$; additionally, the sense interface signal $V_{IS}$ may be used by the control loop clock generator 312 to control the switching frequency.

As illustrated, comparator 532 receives the error amplifier output voltage $V_{EAP}$ at its noninverting input and the sense interface signal $V_{IS}$ at its inverting input to provide a logic high reset signal $V_{RST}$ when the sense interface signal $V_{IS}$ falls below the error amplifier output voltage $V_{EAP}$. Additionally, comparator 534 receives the complementary error amplifier output voltage $V_{EAN}$ at its inverting input and the sense interface signal $V_{IS}$ at its noninverting input to provide a logic high set signal $V_{SET}$ when the sense interface signal $V_{IS}$ exceeds the complementary error amplifier output voltage $V_{EAN}$.

The clock generator 536 may generate the switch signal $S_W$ in response to the reset signal $V_{RST}$ and the set signal $V_{SET}$. Additionally, the clock limit signals $C_{MIN}$, $C_{MAX}$ may control the clock generator 536 to limit a period of the switch signal $S_W$. For instance, clock limit signal $C_{MIN}$ may be used to limit a minimum cycle width (e.g., minimum switching cycle period), and clock limit signal $C_{MAX}$ may be used to limit a maximum cycle width (e.g., maximum switching cycle period).

As illustrated in FIG. 5B, the clock generator 536 may include a logic block 539 and a set reset (SR) latch 538. The logic block 539 receives the reset signal $V_{RST}$, the set signal $V_{SET}$, and the clock limit signals $C_{MIN}$, $C_{MAX}$. The logic block 539 may, in turn, provide a latch reset signal CR and a latch set signal CS to the SR latch 538 to generate the switch signal $S_W$.

Figure 6A:
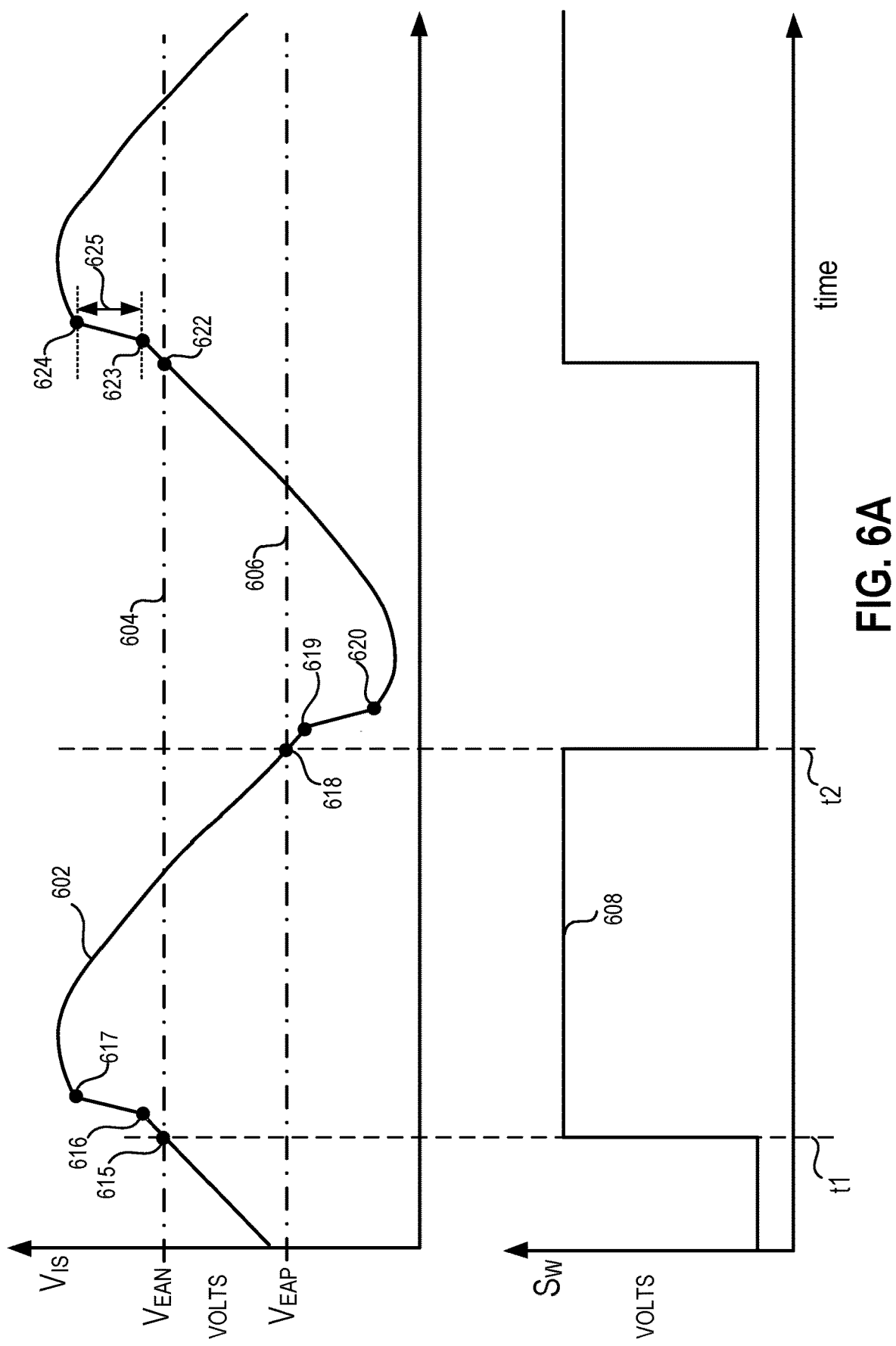
FIG. 6A illustrates example waveforms corresponding to signals in an example LLC converter embodiment.

FIG. 6A illustrates waveforms 602, 604, 606, and 608 corresponding to signals in an LLC converter embodiment (e.g., LLC converter 200a or 200b). Waveform 602 may correspond to sense interface signal $V_{IS}$ versus time; and waveforms 606, 604 may correspond to the error amplifier and complementary error amplifier output signals $V_{EAP}$, $V_{EAN}$, versus time respectively.

Also, with reference to the discussion above, waveform 608 may correspond to switch signal $S_W$ as generated by the control loop clock generator 312. For instance, crossing point 615 at time $t_1$ and crossing point 622 may correspond to when the sense interface signal $V_{IS}$ exceeds the error amplifier output signal $V_{EAN}$; and crossing point 618 at time $t_2$ may correspond to when the sense interface signal $V_{IS}$ drops below the error amplifier output signal $V_{EAP}$. In response, the control loop clock generator 312 toggles the switch signal $S_W$ at crossing points 615, 618, and 622. The delayed point 616 (and 623) may indicate when the switch drive signal GH turns on the HS device 238 in response to the switch $S_W$; and the delayed point 619 may indicate when the switch drive signal GL turns on the LS device 237. Additionally, the sample points 617, 620, and 624 may be indicative of the power transfer within the LLC converter (e.g., LLC converter 200a or 200b). For instance, a voltage difference 625 between sample points 624 and delayed point 623 may be proportional to the input voltage $V_{IN}$.

With reference to FIG. 3, during continuous switching mode the frequency monitor module 115 may use the frequency detector 322 to detect the frequency of the switch signal $S_W$ as illustrated by waveform 608. Alternatively, during startup mode and prior to handover, the frequency monitor module 115 may use the frequency detector 322 to detect the frequency of the sense interface signal $S_{IS}$, which may also have a waveform similar to waveform 602. Also, in detecting the frequency of switch signal $S_W$, the frequency detector 322 may sample data points of the switch signal $S_W$. For instance, an end-of-mode frequency may be determined, at least in part, by measuring and/or storing consecutive edges of the switch signal $S_W$. In one embodiment the consecutive edges may represent a half-period and may be indicative of switching frequency.

Figure 6B:
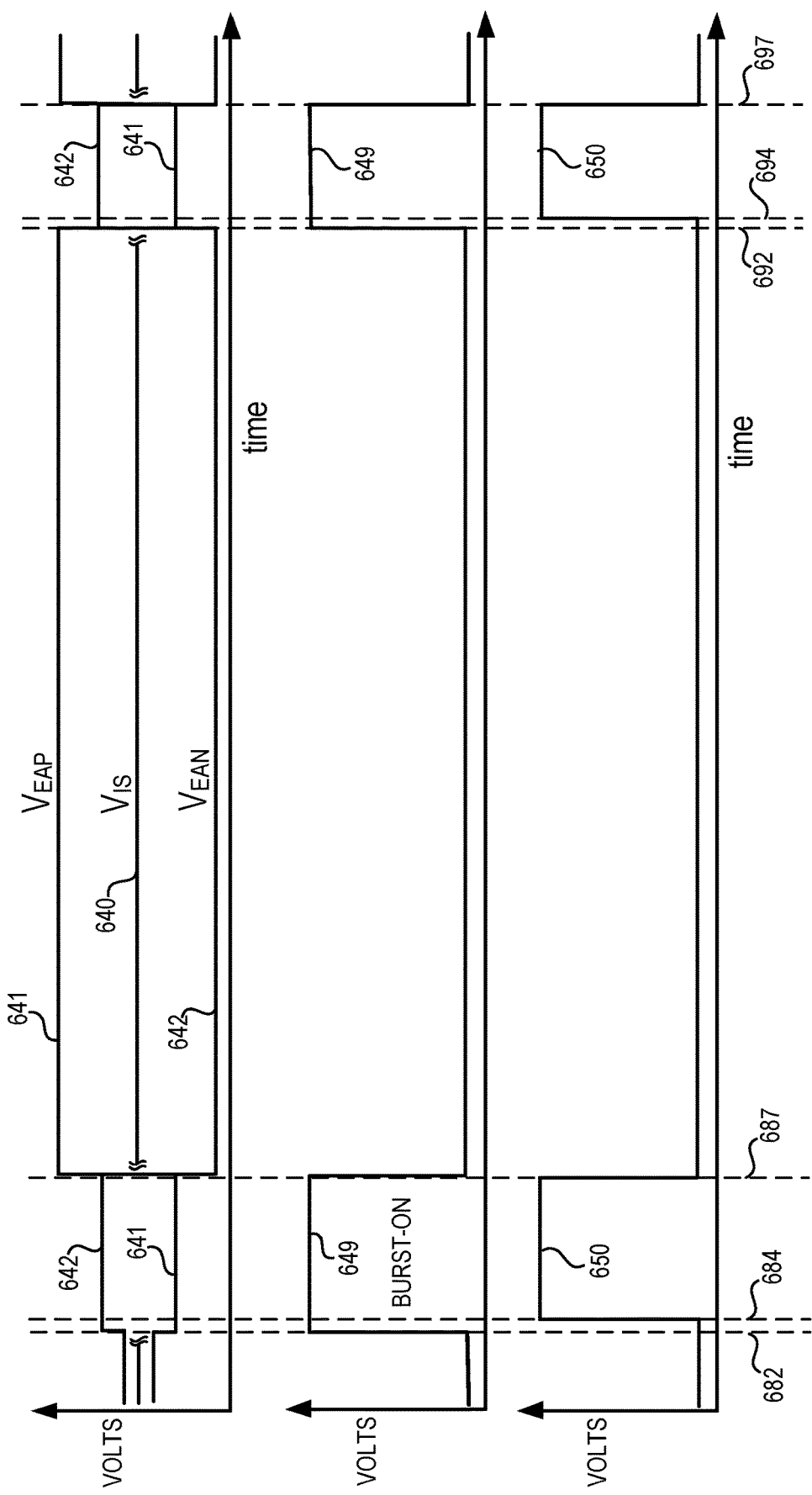
FIG. 6B illustrates example burst mode signal waveforms in an example LLC converter according to an embodiment.

FIG. 6B illustrates burst mode signal waveforms in an LLC converter according to an embodiment. Waveforms 641, 642 may correspond to the error amplifier and complementary error amplifier output signals $V_{EAP}$, $V_{EAN}$, versus time, respectively. The waveform 649 may correspond to a burst logic state. For instance, between times 682 and 687 and times 692 and 697, waveform 649 attains a logic high value indicating a burst-on condition (i.e., a burst-on state); and the time periods or intervals during which the waveform 649 attains a high value may be referred to as burst-on periods. Additionally, the time interval between times 687 and 692 when waveform 649 attains a logic low value may be referred to as a burst-off period.

Waveform 650 may indicate a status of the switch control module 113. For instance, the waveform 650 may correspond to when the switch control module 113 has come out of its standby state (e.g., when the control loop clock generator 312, the sense interface circuit 314, and the voltage loop error amplifier output generator 316 wake-up from standby). As illustrated, waveform 650 toggles from low to high at times 684 and 694, and toggles from high to low at times 687 and 697.

Additionally, waveform 640 may correspond to the sense interface signal $V_{IS}$. Due to the time scale shown in FIG. 6B and for presentation purposes, the sense interface signal $V_{IS}$ is drawn during burst-off intervals (periods) and excluded during burst-on periods.

During the burst-on period and during the initial period (e.g., 10 μs) before the switch control module 113 wakes up from standby and become operable, the secondary control block 232 may use the frequency monitor module 115 as master to control the switch drive signals $G_{DR2}$, GH, GL. Once the switch control module 113 becomes enabled (i.e., when waveform 650 transitions from low to high) then the frequency monitor module 115 may operate as slave to monitor the frequency of the switch signal $S_W$. Prior to transitioning to a burst-off condition at times 687 and 697, the frequency monitor module 115 may store a transition value of the frequency (i.e., an end-of-mode frequency).

During the burst-off periods when waveform 650 is low, the frequency monitor module 115 saves an end-of-mode transition frequency while the switch control module 113 operates in standby to reduce power loss. At time 692 (and time 682) during the transition into burst-on, the frequency monitor module 115 may provide the DCO clock signal $S_{CLK}$ from the DCO 120 based on a recalled value of the end-of-mode frequency.

In addition to recalling the end-of-mode frequency and controlling the switch drive signals $G_{DR2}$, GH, GL by using the DCO 120, the frequency monitor module 115 may adjust a transition frequency in response to a loading condition. For instance, the frequency monitor module 115 may, based on the value of the feedback voltage FB1, adjust the DCO clock signal $S_{CLK}$ to provide additional energy to the load during the initial time periods between times 682 and 684 and between times 692 and 694. For instance, if the output voltage $V_O$ droops below a pre-determined level during a burst-off interval, then the frequency monitor module 115 may decrease the transition frequency by a scale factor (e.g., by two-thirds, or by sixty seven percent) in order to provide more power to the load 106 when entering the burst-on interval at times 682 and 692.

Figure 6C:
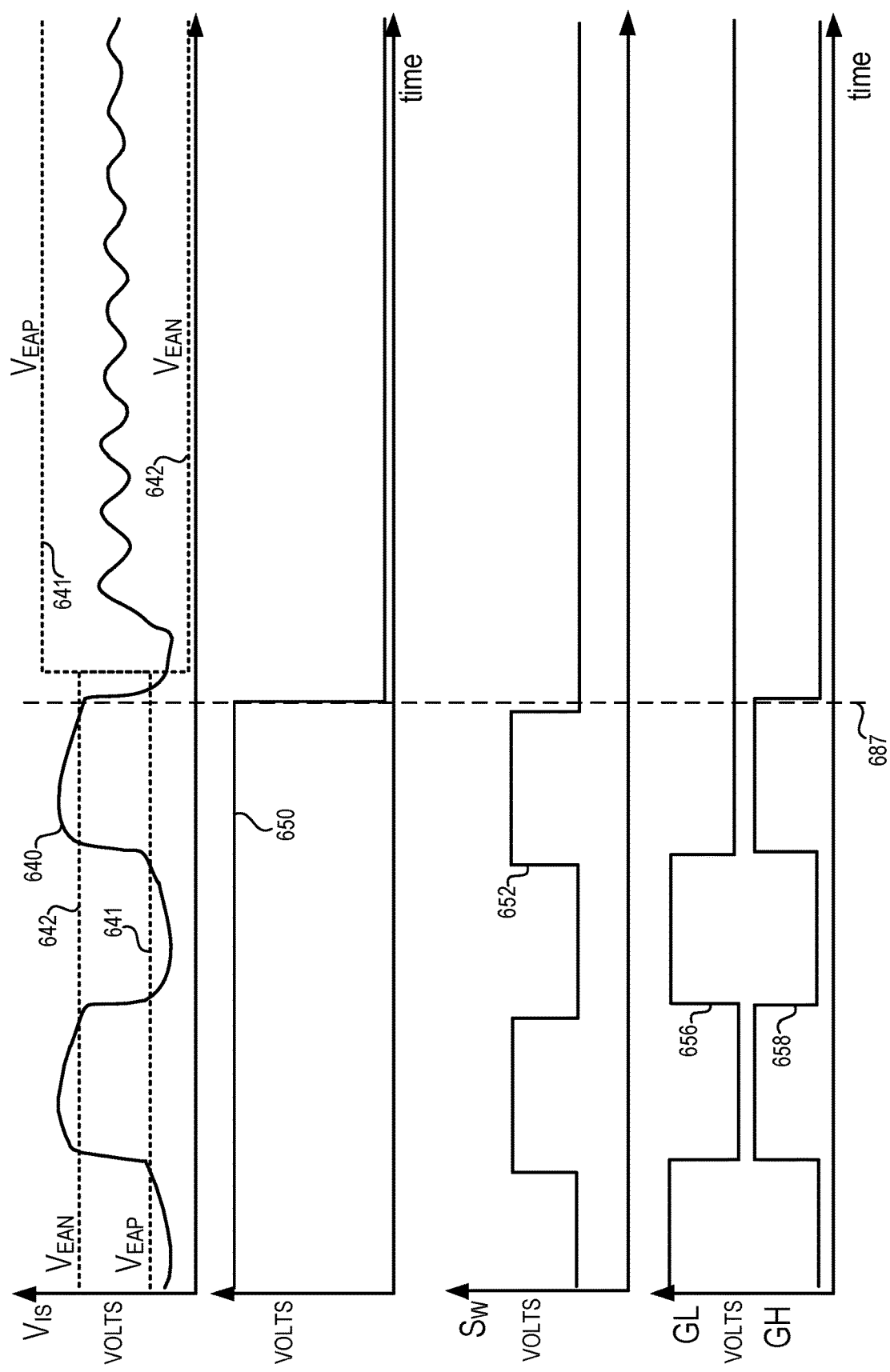
FIG. 6C illustrates example burst mode signal waveforms during a first burst mode transition in an example LLC converter according to an embodiment.

FIG. 6C illustrates burst mode signal waveforms during a first burst mode transition in an LLC converter according to an embodiment. Waveforms are plotted on a time scale to provide more detail of switching behavior at the transition (i.e., at time 687) from burst-on to burst-off. Waveforms 641,642 may correspond to the error amplifier and complementary error amplifier output signals $V_{EAP}$, $V_{EAN}$, versus time, respectively. Waveform 640 may correspond to the sense interface signal $V_{IS}$; and waveform 650 may indicate a status of the switch control module 113. Additionally, waveform 652 may correspond to the switch signal $S_W$; and waveforms 656 and 658 may correspond to the switch drive signal GL and switch drive signal GH, respectively.

As illustrated, during burst-on, the waveforms 652, 656, 658 undergo switching and the switch control module 113 may generate the switch signal $S_W$ corresponding to waveform 652. Then, prior to the transition time at time 687, the frequency monitor module 115 may store a transition end-of-mode frequency of the switch signal $S_W$ corresponding to waveform 652.

Also, as illustrated by waveforms 641, 642, during burst-off, the error amplifier and complementary error amplifier output signals $V_{EAP}$, $V_{EAN}$, may transition following time 687. In one embodiment, the error amplifier and complementary error amplifier output signals $V_{EAP}$, $V_{EAN}$, may transition to values determined, at least in part, by a predetermined value of the compensated voltage $V_{COMP}$. For instance, during burst-off, the operational amplifier 414 may operate in standby mode and the compensated voltage $V_{COMP}$ may be clamped to a fixed, predetermined value (e.g., a fixed clamp voltage). The error amplifier and complementary error amplifier output signals $V_{EAP}$, $V_{EAN}$, in turn, may transition to values dependent upon and in relation to the compensated voltage $V_{COMP}$. Additionally, although waveforms 641, 642 illustrate a configuration whereby during burst-off, the error amplifier output signal $V_{EAP}$ transitions above the complementary error amplifier output $V_{EAN}$, other configurations may be possible.

Figure 6D:
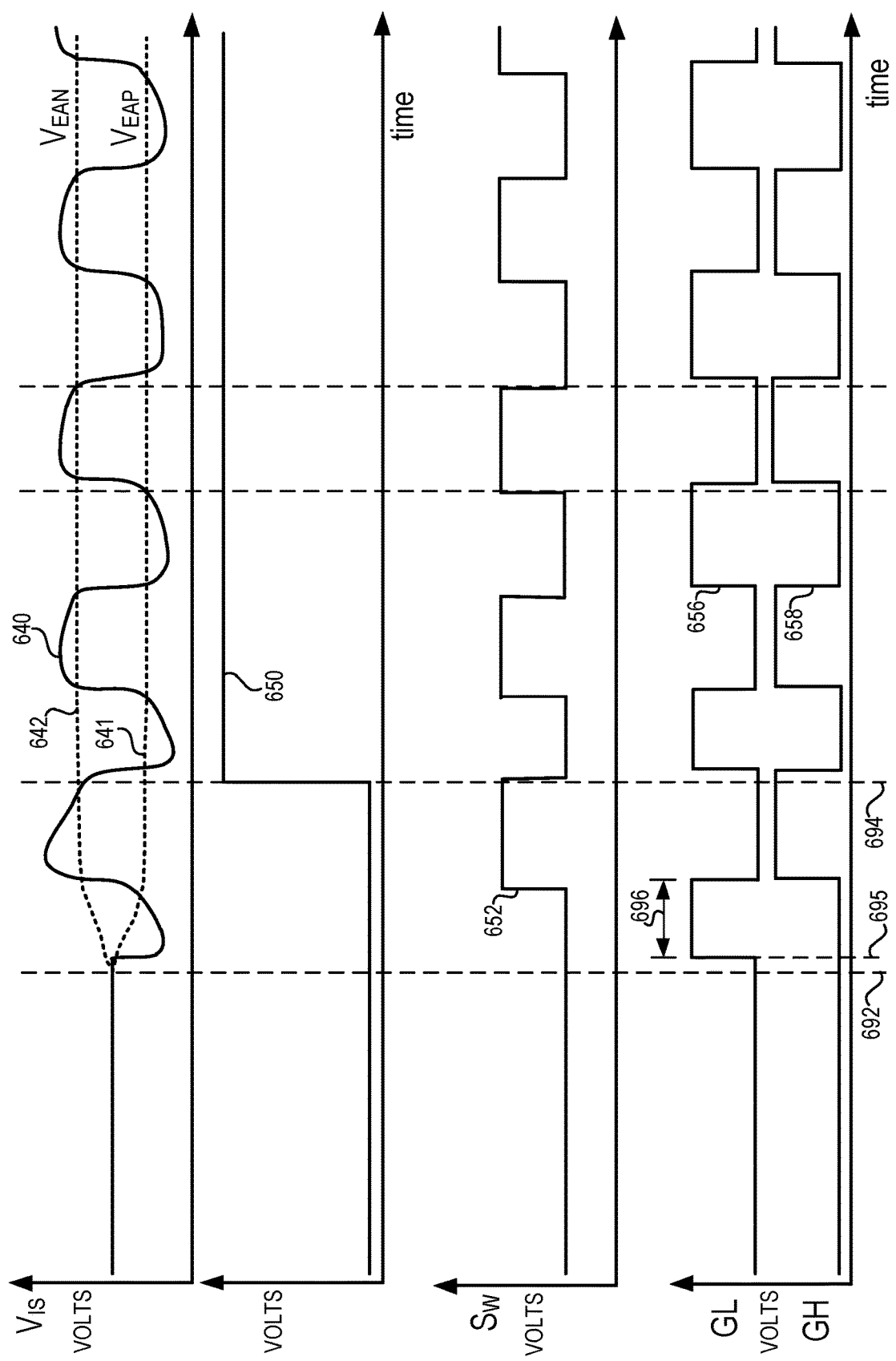
FIG. 6D illustrates example burst mode signal waveforms during a second burst mode transition in an example LLC converter according to an embodiment.

FIG. 6D illustrates burst mode signal waveforms during a second burst mode transition in an LLC converter according to an embodiment. Waveforms are again plotted on a time scale to provide more detail of switching behavior at the transition (i.e., at time 692) from burst-off to burst-on. Waveforms 641, 642 again may correspond to the error amplifier and complementary error amplifier output signals $V_{EAP}$, $V_{EAN}$, versus time, respectively. Waveform 640 may correspond to the sense interface signal $V_{IS}$; and waveform 650 again may indicate a status of the switch control module 113.

As illustrated, waveform 650 toggles from low to high at time 694; and during the initial time period between time 692 and time 694 the frequency monitor module 115 may operate as master to provide the DCO clock signal $S_{CLK}$ from the DCO 120. The frequency monitor module 115 may recall the stored transition frequency (e.g., the end-of-mode frequency of waveform 652 prior to time 687 from FIG. 6C) and provide the DCO clock signal $S_{CLK}$ based on the recalled end-of-mode frequency. The frequency monitor module 115 may also adjust the frequency of the DCO clock signal $S_{CLK}$ at time 692 in order to compensate for load variations. For instance, as shown in FIG. 6D, the period of waveform 652 is longer during the interval between times 692 and 694 while the frequency monitor module 115 operates as master. At time 694, the frequency monitor module 115 again operates as slave while the switch control module 113 generates the switch signal $S_W$.

Additionally, and alternatively, the switch drive signal GL may be provided with an initial pulse having a controlled pulse width. For instance, as shown in FIG. 6D, waveform 656 of the switch drive signal GL may have an initial pulse beginning at time 695 with a pulse width 696 lesser than subsequent pulse widths. By controlling the initial pulse in this manner, burst-on performance may be enhanced.

Figure 7A:
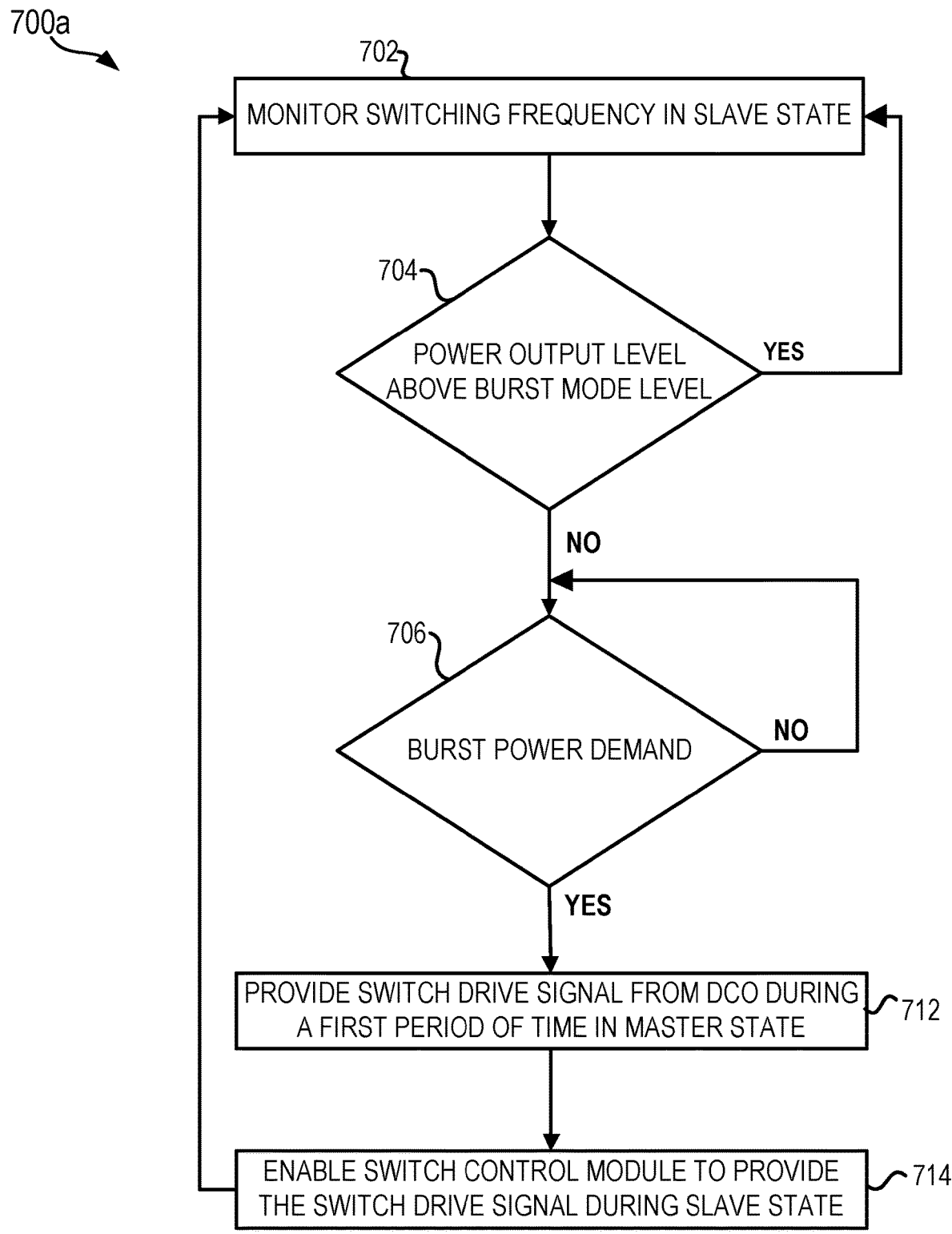
FIG. 7A illustrates an example flow diagram for controlling a switch drive signal in an example switching power converter according to an embodiment.

FIG. 7A illustrates a flow diagram 700a for controlling a switch drive signal in a switching power converter according to an embodiment. Step 702 may refer to using the frequency monitor module 115 as a slave to monitor frequency by monitoring the switch signal $S_W$ in continuous condition mode and/or in burst-on.

Decision step 704 may correspond to monitoring output power level to determine if a burst mode condition exists. For instance, if the load 106 reduces to light load, the power level may reduce to and or below a burst mode criterion. If a threshold for burst mode is detected, then the method may continue to the next step 706; otherwise, if the power output level is above the burst mode level, then the method may return to step 702. Upon determining that the output power level is reduced to a light load (burst mode) level, the method continues to the decision step 706 operating in burst mode.

Decision step 706 can correspond to determining if a burst-on or burst-off condition exists. If a burst-off condition exists, then the controller 204 may place the switch control module 113 in standby to reduce power loss and may also use the frequency monitor module 115 to store a transition end-of-mode frequency. If a burst-on condition exists, then the method may continue to step 712.

Step 712 may correspond to using the frequency monitor module 115 for a first period (e.g., during the time period from time 692 to time 694) to operate as master and provide the DCO clock signal $S_{CLK}$. Then following step 714 may correspond to using the switch control module 113 to generate the switch signal $S_W$ (e.g. after time 694) while the frequency monitor module 115 operates as slave.

Figure 7B:
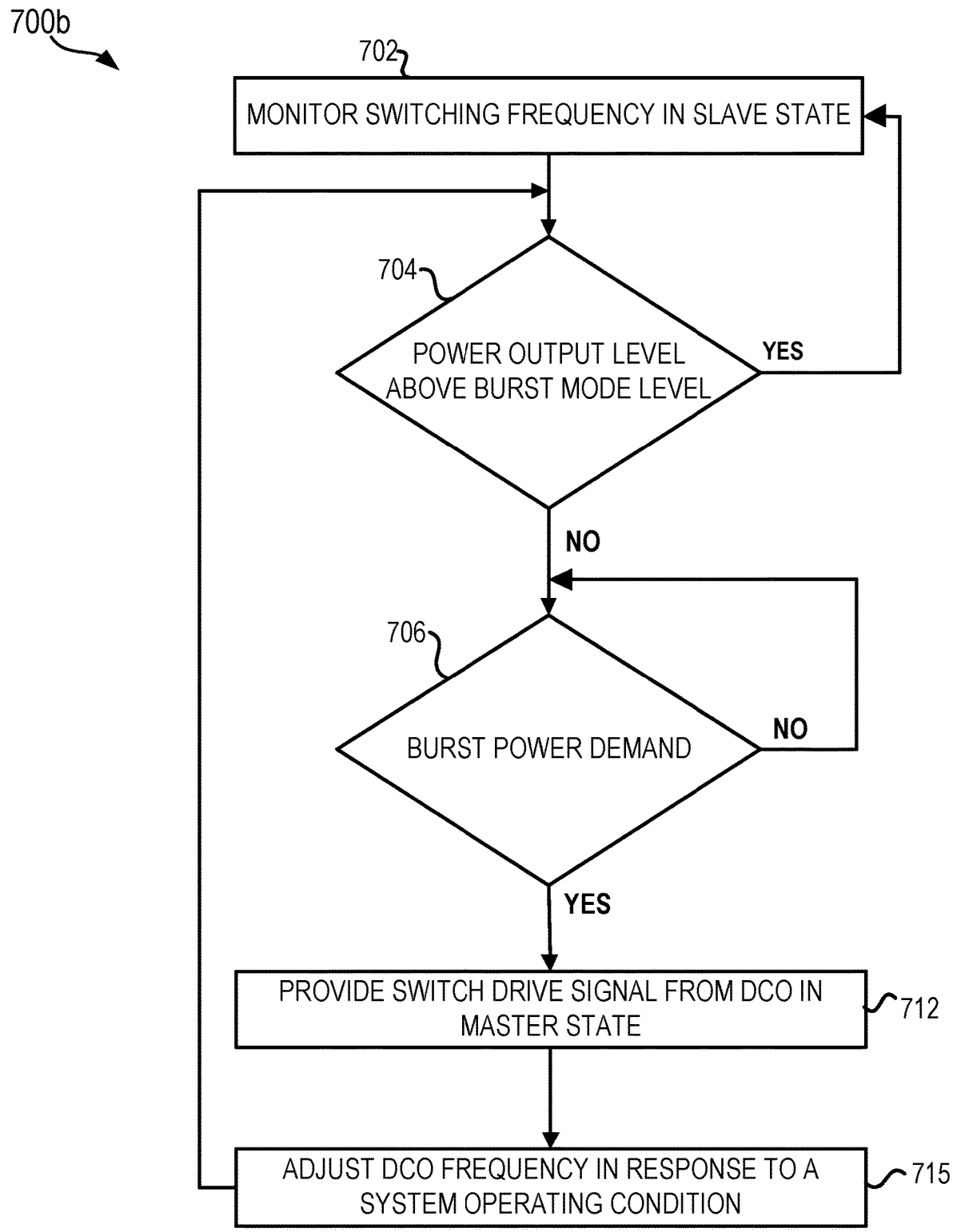
FIG. 7B illustrates an example flow diagram for controlling a switch drive signal in another example switching power converter according to another embodiment.

FIG. 7B illustrates a flow diagram 700b for controlling a switch drive signal in a switching power converter according to another embodiment. The flow diagram 700b is similar to that of flow diagram 700a, except flow diagram 700b replaces step 714 with a step 715. In the embodiment of FIG. 7B, step 715 may correspond to using the frequency monitor module 115 to operate as master for the entire burst-on period. During burst-on, the frequency monitor module 115 may adjust the DCO clock signal $S_{CLK}$ in response to system operating conditions. For instance, the frequency monitor module 115 may adjust a frequency of the DCO clock signal $S_{CLK}$ in response to feedback from feedback signal FB1 so as to regulate the output voltage $V_O$.

Figure 7C:
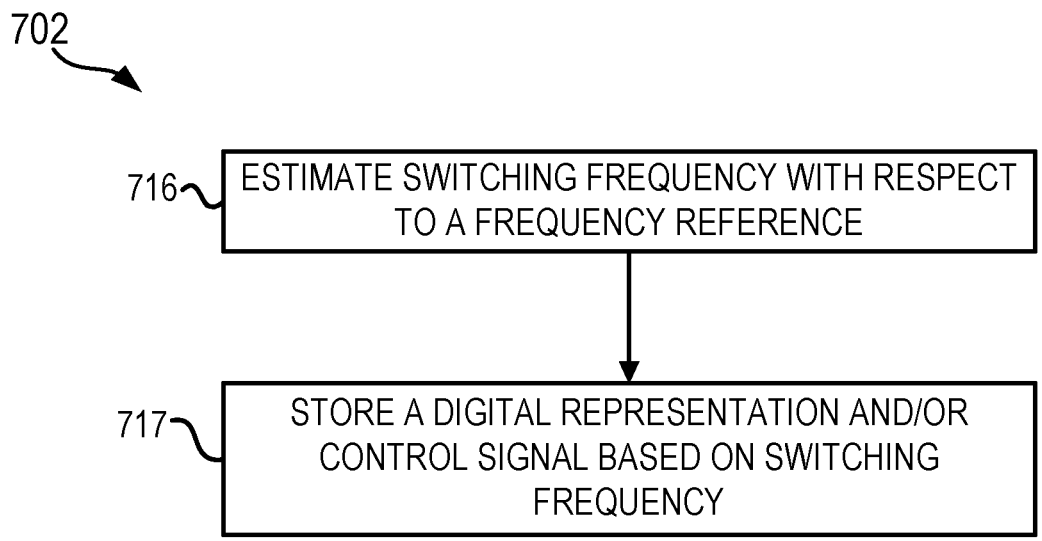
FIG. 7C illustrates an example flow diagram of an example method for monitoring switching frequency during a slave state.

FIG. 7C illustrates a flow diagram of a method for monitoring switching frequency during a slave state corresponding to step 702. Step 716 may correspond to using the frequency comparator circuit 334 as discussed in regard to FIG. 3. Step 717 may correspond to generating and saving control signals (e.g., control signal CT2) to control the DCO 120 based on a transition end-of-mode frequency.

Figure 7D:
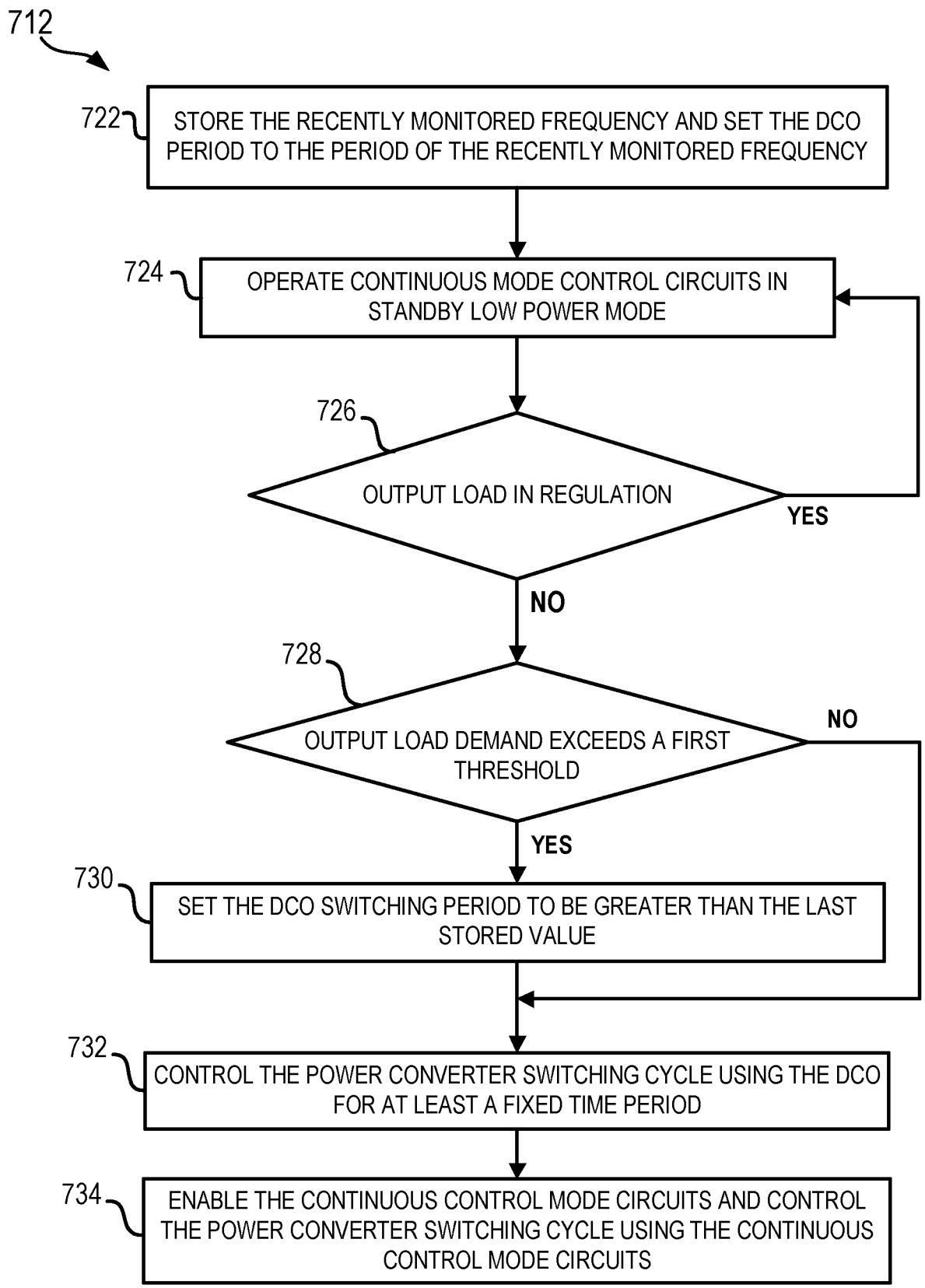
FIG. 7D illustrates an example flow diagram of an example method for controlling a switch drive signal during a master state.

FIG. 7D illustrates a flow diagram of a method for controlling a switch drive signal during a master state corresponding to step 712. Step 722 may correspond to storing a recently monitored frequency (e.g., a transition end-of-mode frequency) and its corresponding cycle period. Step 724 may correspond to placing the switch control module 113 and/or its circuits (e.g., the control loop clock generator 312, the sense interface circuit 314, and the voltage loop error amplifier output generator 316) into standby while in burst-off. Decision step 726 may correspond to monitoring the output voltage $V_O$ by using the feedback signal FB1 to determine if a burst-on condition exists. When the output voltage $V_O$ reduces below a predetermined burst level, then the method may proceed to the next decision step 728 and operate in burst-on. Decision step 728 may correspond to using the feedback signal FB1 to determine if the recently monitored frequency (i.e., the transition end-of-mode frequency) needs to be adjusted based on output current $I_O$ (i.e., load). If the load demand exceeds a first threshold then the method proceeds to step 730 to increase the period of the DCO signal clock $S_{CLK}$. Otherwise, the method proceeds to step 732. Step 732 corresponds to operating the frequency monitor module 115 as master using the DCO 120 to provide the DCO clock signal $S_{CLK}$; and step 734 may correspond to the transition following time 694 when the switch control module 113 generates the switch signal $S_W$ and the frequency monitor module 115 operates as slave.

Figure 8:
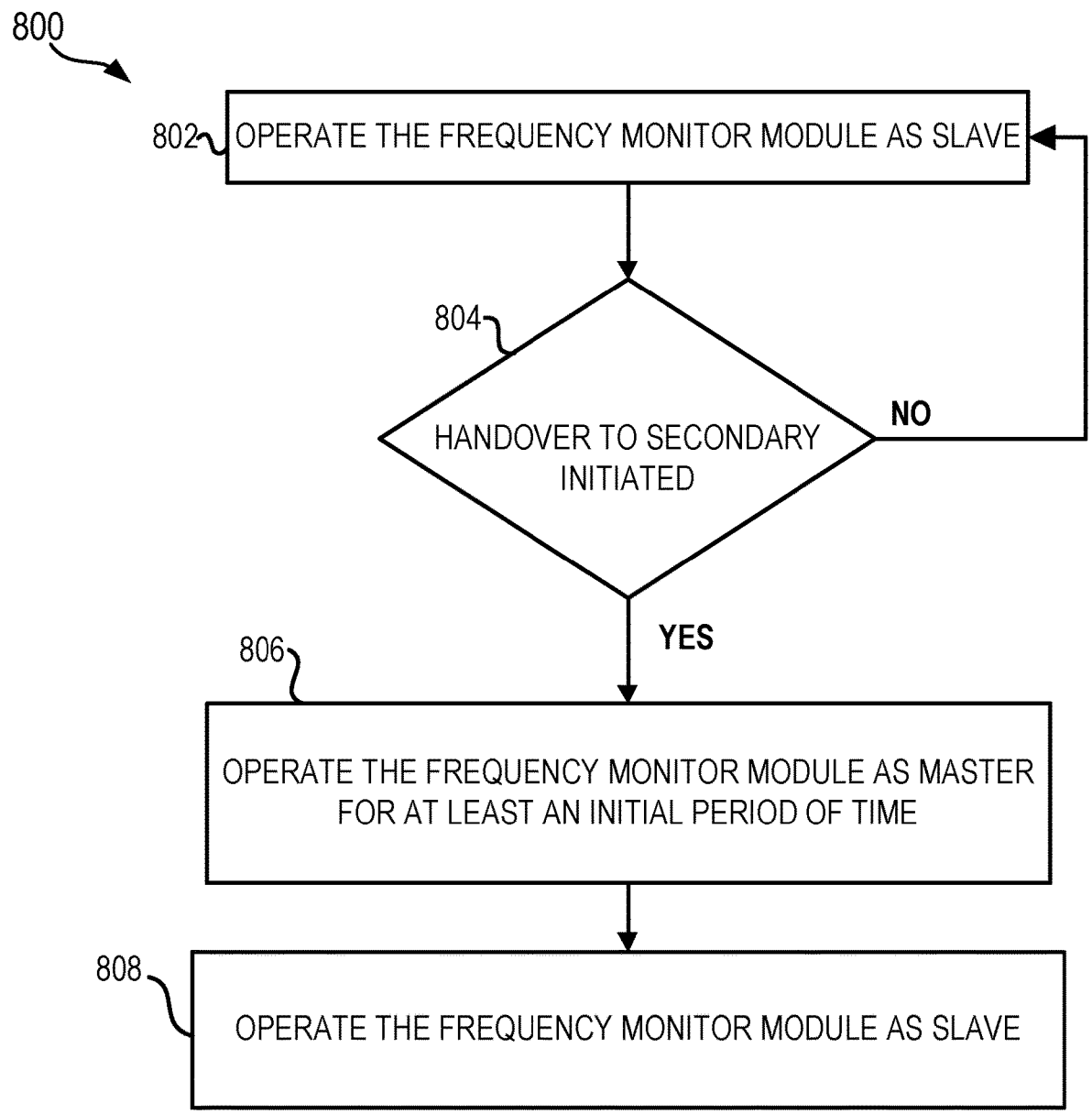
FIG. 8 illustrates an example flow diagram for controlling a switch drive signal during handover in an example LLC converter according to an embodiment.

FIG. 8 illustrates a flow diagram 800 for controlling a switch drive signal during handover in an LLC converter according to an embodiment. Referring to FIG. 2A and 2B, step 802 may refer to when the switch drive controller 130 at the primary side uses the startup control circuit 135 to provide the switch drive signals GH and GL. During step 802, the frequency monitor module 115 may also monitor frequency by monitoring the sense interface signal $S_{IS}$.

Decision step 804 may correspond to determining if handover to the secondary has occurred. If a handover criterion is satisfied, then the method continues to step 806. Step 806 can correspond to operating the frequency monitor module 115 as master for at least a first period of time until the switch control module 113 and its circuits (e.g., the control loop clock generator 312, the sense interface circuit 314, and the voltage loop error amplifier output generator 316) become operable. Then step 808 may correspond to operating the frequency monitor module 115 as slave while the switch control module 113 generates the switch signal $S_W$.

The above description of illustrated examples of the present disclosure, including what is described in the Abstract, are not intended to be exhaustive or to be limitation to the precise forms disclosed. While specific embodiments of, and examples for controlling a switch drive signal following mode transitions in a switching power converter are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

Although the present invention is defined in the claims, it should be understood that the present invention can alternatively be defined in accordance with the following examples:

EXAMPLE 1

A controller for use in a power converter configured to operate in a plurality of modes including a first mode and a second mode, the controller comprising: a frequency monitor module coupled to measure a signal characteristic of a switch drive signal coupled to control switching of a switches block of the power converter, wherein the frequency monitor module includes a memory coupled to store a measured signal characteristic of the switch drive signal measured during the first mode, wherein the frequency monitor module is coupled to generate a clock signal in response to the measured signal characteristic stored in the memory, wherein the switch drive signal is coupled to be generated in response to the clock signal during the second mode.

EXAMPLE 2

The controller of example 1, wherein the power converter is a resonant converter.

EXAMPLE 3

The controller of any one of the previous examples, wherein the signal characteristic comprises at least one of a switching frequency and a duty cycle to generate the clock signal.

EXAMPLE 4

The controller of any one of the previous examples, wherein the frequency monitor module further comprises a digitally controlled oscillator (DCO) coupled to generate the clock signal.

EXAMPLE 5

The controller of any one of the previous examples, wherein the frequency monitor module further comprises: a frequency reference oscillator coupled to provide a frequency reference; and a frequency detector coupled to the frequency reference oscillator to determine the measured signal characteristic of the switch drive signal in relation to the frequency reference.

EXAMPLE 6

The controller of any one of the previous examples, wherein the frequency detector further comprises frequency comparator including a counter coupled to the frequency reference oscillator to count a number of frequency reference switching cycles relative to a number of switch drive signal switching cycles to determine the measured signal characteristic of the switch drive signal, wherein the DCO is coupled to receive a second control signal from the frequency comparator to generate the clock signal.

EXAMPLE 7

The controller of any one of the previous examples, wherein the frequency monitor module further comprises a signal limit generator coupled to receive a first control signal from the frequency comparator to generate first and second clock limit signals, the first and second clock limit signals configured to limit a minimum and maximum of the signal characteristics of the switch drive signal.

EXAMPLE 8

The controller of any one of the previous examples, wherein the first control signal from the frequency comparator is coupled to be stored in the memory.

EXAMPLE 9

The controller of any one of the previous examples, wherein the frequency detector further comprises a second multiplexor coupled to receive a switch signal and a sense interface signal, wherein the second multiplexer is coupled to provide the switch signal or the sense interface signal to the frequency comparator in response to a second multiplexor control signal to measure the signal characteristic of the switch drive signal.

EXAMPLE 10

The controller of any one of the previous examples, wherein the frequency monitor module is coupled to control the switch drive signal during the second mode such that a switching frequency of the switch drive signal is proportional to the measured signal characteristic of the switch drive signal, and wherein the measured signal characteristic of the switch drive signal includes an end-of-mode frequency corresponding to a measurement of a switching frequency of the switch drive signal prior to a transition from the first mode to the second mode.

EXAMPLE 11

The controller of any one of the previous examples, wherein the first mode is a startup primary mode and the second mode is a secondary mode.

EXAMPLE 12

The controller of any one of the previous examples, wherein the first mode is a continuous switching mode, and wherein the second mode is a burst mode comprising at least one burst-on period during which the switch drive signal comprises a nonzero switching frequency and at least one burst-off period during which the switch drive signal comprises a null switching frequency.

EXAMPLE 13

The controller of any one of the previous examples, wherein during the at least one burst-on period of the second mode, the frequency monitor module is configured to control the switch drive signal such that the switching frequency is substantially equal to the end-of-mode frequency.

EXAMPLE 14

The controller of any one of the previous examples, further comprising a switch control module comprising at least one control loop comprising control loop circuits coupled to generate a switch signal to control the switch drive signal and to control the switching frequency of the switch drive signal in relation to at least one feedback signal during the first mode, wherein said at least one feedback signal is indicative of a power stage signal of a power stage of the power converter.

EXAMPLE 15

The controller of any one of the previous examples, further comprising a first multiplexor coupled to receive the switch signal and the clock signal, wherein the switches block of the power converter is coupled to be driven in response to an output of the first multiplexor in response to a first multiplexor control signal.

EXAMPLE 16

The controller of any one of the previous examples, wherein the power stage signal comprises an output voltage of the power stage.

EXAMPLE 17

The controller of any one of the previous examples, wherein the power stage signal comprises a switching current of the power stage.

EXAMPLE 18

The controller of any one of the previous examples, wherein during an initial time interval of the at least one burst-on period of the second mode, the control loop circuits are coupled to operate in a standby state, and the frequency monitor module is configured to control the switch drive signal.

EXAMPLE 19

The controller of any one of the previous examples, wherein subsequent to the initial time interval of the at least one burst-on period of the second mode, the control loop circuits are coupled to control the switch drive signal, and the frequency monitor module is coupled to measure the switching frequency of the switch drive signal.

EXAMPLE 20

The controller of any one of the previous examples, wherein the at least one control loop comprises a voltage control loop and a current control loop, wherein the at least one feedback signal comprises a first feedback signal and a second feedback signal, wherein the voltage control loop is coupled to provide a first signal in relation to the first feedback signal, wherein the current control loop is coupled to provide a second signal in relation to the second feedback signal, and wherein the at least one control loop is coupled to control the switching frequency based upon a comparison of the first signal to the second signal.

EXAMPLE 21

A resonant power converter, comprising: an energy transfer element coupled between an input of the resonant power converter and an output of the resonant power converter; a switches block coupled to an input of the energy transfer element and to the input of the resonant power converter; and a controller coupled to generate a switch drive signal having a switching frequency to drive the switches block to control a transfer of energy from the input of the resonant power converter to the output of the resonant power converter, wherein the controller includes: a frequency monitor module configured to operate in a plurality of states comprising a master state and a slave state, wherein the frequency monitor module is coupled to monitor the switching frequency of the switch drive signal during the slave state, wherein the frequency monitor module is coupled to generate a clock signal to control the switch drive signal during the master state.

EXAMPLE 22

The resonant power converter of example 21, wherein the frequency monitor module comprises: a frequency reference oscillator coupled to provide a frequency reference; and a frequency detector including a frequency comparator coupled to the frequency reference oscillator to measure the switching frequency of the switch drive signal in relation to the frequency reference.

EXAMPLE 23

The resonant power converter of any one of the previous examples, further comprising: a switch control module coupled to generate a switch signal to control the switch drive signal during the slave state, wherein the resonant power converter is configured to operate in a plurality of converter modes comprising a continuous switching mode and a burst mode, the burst mode comprising at least one burst-on period during which the switch drive signal comprises a nonzero switching frequency and at least one burst-off period during which the switch drive signal comprises a null switching frequency, wherein the resonant power converter is configured to transition from the continuous switching mode to the burst mode at a burst transition time, and wherein the frequency monitor module is configured to store a transition frequency measured by a frequency comparator of the frequency detector in a memory prior to the burst transition time.

EXAMPLE 24

The resonant power converter of any one of the previous examples, wherein the controller further comprises a multiplexor coupled to receive the switch signal and the clock signal, wherein the switches block is coupled to be driven in response to an output of the multiplexor in response to a multiplexor control signal.

EXAMPLE 25

The resonant power converter of any one of the previous examples, wherein the frequency monitor module is configured to operate in the slave state prior to the burst transition time and to operate in the master state for at least an initial time interval during the at least one burst-on period.

EXAMPLE 26

The resonant power converter of any one of the previous examples, wherein the frequency monitor module is configured to operate in the slave state subsequent to the initial time interval during the at least one burst-on period.

EXAMPLE 27

The resonant power converter of any one of the previous examples, wherein the frequency monitor module is configured to control the switch drive signal such that the switching frequency is substantially equal to the transition frequency.

EXAMPLE 28

The resonant power converter of any one of the previous examples, wherein the frequency monitor module is configured to control the switch drive signal such that the switching frequency is less than the transition frequency.

EXAMPLE 29

The resonant power converter of any one of the previous examples, wherein the switching frequency is substantially equal to sixty seven percent of the transition frequency.

EXAMPLE 30

The resonant power converter of any one of the previous examples, wherein the switch control module comprises at least one control loop comprising control loop circuits configured to control the switch drive signal and to control the switching frequency in relation to at least one feedback signal during the slave state, the at least one feedback signal indicative of a power stage signal.

EXAMPLE 31

The resonant power converter of any one of the previous examples, wherein the power stage signal comprises an output voltage of the power stage.

EXAMPLE 32

The resonant power converter of any one of the previous examples, wherein the power stage signal comprises a switching current of the power stage.

EXAMPLE 33

The resonant power converter of any one of the previous examples, wherein during the at least one burst-off period, the control loop circuits are configured to operate in a standby state.

EXAMPLE 34

The resonant power converter of any one of the previous examples, wherein the at least one control loop comprises a voltage control loop and a current control loop, wherein the at least one feedback signal comprises a first feedback signal and a second feedback signal, wherein the voltage control loop is configured to provide a first signal and a second signal in relation to the first feedback signal, wherein the current control loop is configured to provide a third signal in relation to the second feedback signal, and wherein the at least one control loop is configured to control the switching frequency based upon a comparison of the first and second signals to the third signal.

EXAMPLE 35

The resonant power converter of any one of the previous examples, wherein the resonant power converter is configured to operate in a plurality of converter modes comprising a primary mode and a secondary mode and configured to transition from the primary mode to the secondary mode at a handover time, the resonant power converter further comprising: a startup control circuit configured to control the switch drive signal during the primary mode, wherein the frequency monitor module is configured to monitor the switching frequency during the primary mode and to store a handover frequency measured by the frequency comparator circuit in a memory prior to the handover time.

EXAMPLE 36

The resonant power converter of any one of the previous examples, wherein the frequency monitor module is configured to operate in the master state for at least an initial time interval subsequent to the handover time.

EXAMPLE 37

The resonant power converter of any one of the previous examples, wherein the frequency monitor module is configured to operate in the slave state subsequent to the initial time interval.

EXAMPLE 38

A method of controlling a switching signal in a switching power converter, comprising: controlling the switching signal using a switch control module during a continuous switching mode, the switch control module comprising at least one switch control circuit; monitoring a switching frequency of the switching signal using a frequency monitor module during the continuous switching mode; storing a transition frequency value of the switching frequency prior to transitioning from the continuous switching mode to a discontinuous mode; and controlling the switching signal using the frequency monitor module during the discontinuous mode.

EXAMPLE 39

The method of example 38, wherein the switching power converter is a resonant converter.

EXAMPLE 40

The method of any one of the previous examples, wherein controlling the switching signal using the frequency monitor module during the discontinuous mode comprises: concurrently operating the at least one switch control circuit in a standby state.

EXAMPLE 41

The method of any one of the previous examples, wherein controlling the switching signal using the frequency monitor module during the discontinuous mode comprises: controlling the switching signal such that the switching frequency is substantially equal to the transition frequency value.

EXAMPLE 42

The method of any one of the previous examples, wherein controlling the switching signal using the frequency monitor module during the discontinuous mode comprises: controlling the switching signal such that the switching frequency is less than the transition frequency value.

EXAMPLE 43

The method of any one of the previous examples, wherein the switching frequency is substantially equal to sixty seven percent of the transition frequency value.

EXAMPLE 44

The method of any one of the previous examples, wherein controlling the switching signal using the frequency monitor module during the discontinuous mode comprises: controlling the switching signal for at least an initial time interval.

EXAMPLE 45

The method of any one of the previous examples, wherein controlling the switching signal using the frequency monitor module during the discontinuous mode further comprises: subsequently controlling the switching signal using the switch control module.

EXAMPLE 46

A method of starting a switching power converter, comprising: controlling a switching signal using a switch drive controller during a primary mode; monitoring a switching frequency of the switching signal using a frequency monitor module during the primary mode; storing a handover frequency value of the switching frequency prior to transitioning from the primary mode to a secondary mode; and controlling the switching signal using the frequency monitor module during the secondary mode.

EXAMPLE 47

The method of example 46, wherein controlling the switching signal using the frequency monitor module during the secondary mode comprises: controlling the switching signal such that the switching frequency is substantially equal to the handover frequency value.

EXAMPLE 48

The method of any one of the previous examples, wherein controlling the switching signal using the frequency monitor module during the secondary mode comprises: controlling the switching signal for at least an initial time interval.

What is claimed is:

1. A controller for use in a power converter configured to operate in a plurality of modes including a first mode and a second mode, the controller comprising:
    a frequency monitor module coupled to measure a signal characteristic of a switch drive signal coupled to control switching of a switches block of the power converter, wherein the frequency monitor module includes a memory coupled to store a measured signal characteristic of the switch drive signal measured during the first mode, wherein the frequency monitor module is coupled to generate a clock signal in response to the measured signal characteristic stored in the memory, wherein the switch drive signal is coupled to be generated in response to the clock signal during the second mode.

2. The controller of claim 1, wherein the power converter is a resonant converter.

3. The controller of claim 1, wherein the signal characteristic comprises at least one of a switching frequency and a duty cycle to generate the clock signal.

4. The controller of claim 1, wherein the frequency monitor module further comprises a digitally controlled oscillator (DCO) coupled to generate the clock signal.

5. The controller of claim 4, wherein the frequency monitor module further comprises:
    a frequency reference oscillator coupled to provide a frequency reference; and
    a frequency detector coupled to the frequency reference oscillator to determine the measured signal characteristic of the switch drive signal in relation to the frequency reference.

6. The controller of claim 5, wherein the frequency detector further comprises frequency comparator including a counter coupled to the frequency reference oscillator to count a number of frequency reference switching cycles relative to a number of switch drive signal switching cycles to determine the measured signal characteristic of the switch drive signal, wherein the DCO is coupled to receive a second control signal from the frequency comparator to generate the clock signal.

7. The controller of claim 6, wherein the frequency monitor module further comprises a signal limit generator coupled to receive a first control signal from the frequency comparator to generate first and second clock limit signals, the first and second clock limit signals configured to limit a minimum and a maximum of the signal characteristic of the switch drive signal.

8. The controller of claim 7, wherein the first control signal from the frequency comparator is coupled to be stored in the memory.

9. The controller of claim 8, wherein the frequency detector further comprises a second multiplexor coupled to receive a switch signal and a sense interface signal, wherein the second multiplexer is coupled to provide the switch signal or the sense interface signal to the frequency comparator in response to a second multiplexor control signal to measure the signal characteristic of the switch drive signal.

10. The controller of claim 1,
    wherein the frequency monitor module is coupled to control the switch drive signal during the second mode such that a switching frequency of the switch drive signal is proportional to the measured signal characteristic of the switch drive signal, and
    wherein the measured signal characteristic of the switch drive signal includes an end-of-mode frequency corresponding to a measurement of a switching frequency of the switch drive signal prior to a transition from the first mode to the second mode.

11. The controller of claim 10, wherein the first mode is a startup primary mode and the second mode is a secondary mode.

12. The controller of claim 10, wherein the first mode is a continuous switching mode, and wherein the second mode is a burst mode comprising at least one burst-on period during which the switch drive signal comprises a nonzero switching frequency and at least one burst-off period during which the switch drive signal comprises a null switching frequency.

13. The controller of claim 12, wherein during the at least one burst-on period of the second mode, the frequency monitor module is configured to control the switch drive signal such that the switching frequency is substantially equal to the end-of-mode frequency.

14. The controller of claim 12, further comprising a switch control module comprising at least one control loop comprising control loop circuits coupled to generate a switch signal to control the switch drive signal and to control the switching frequency of the switch drive signal in relation to at least one feedback signal during the first mode, wherein said at least one feedback signal is indicative of a power stage signal of a power stage of the power converter.

15. The controller of claim 14, further comprising a first multiplexor coupled to receive the switch signal and the clock signal, wherein the switches block of the power converter is coupled to be driven in response to an output of the first multiplexor in response to a first multiplexor control signal.

16. The controller of claim 14, wherein the power stage signal comprises an output voltage of the power stage.

17. The controller of claim 14, wherein the power stage signal comprises a switching current of the power stage.

18. The controller of claim 14, wherein during an initial time interval of the at least one burst-on period of the second mode, the control loop circuits are coupled to operate in a standby state, and the frequency monitor module is configured to control the switch drive signal.

19. The controller of claim 18, wherein subsequent to the initial time interval of the at least one burst-on period of the second mode, the control loop circuits are coupled to control the switch drive signal, and the frequency monitor module is coupled to measure the switching frequency of the switch drive signal.

20. The controller of claim 14, wherein the at least one control loop comprises a voltage control loop and a current control loop, wherein the at least one feedback signal comprises a first feedback signal and a second feedback signal, wherein the voltage control loop is coupled to provide a first signal in relation to the first feedback signal, wherein the current control loop is coupled to provide a second signal in relation to the second feedback signal, and wherein the at least one control loop is coupled to control the switching frequency based upon a comparison of the first signal to the second signal.

21. A resonant power converter, comprising:
an energy transfer element coupled between an input of the resonant power converter and an output of the resonant power converter;
a switches block coupled to an input of the energy transfer element and to the input of the resonant power converter; and
a controller coupled to generate a switch drive signal having a switching frequency to drive the switches block to control a transfer of energy from the input of the resonant power converter to the output of the resonant power converter, wherein the controller includes:
a frequency monitor module configured to operate in a plurality of states comprising a master state and a slave state, wherein the frequency monitor module is coupled to monitor the switching frequency of the switch drive signal during the slave state, wherein the frequency monitor module is coupled to generate a clock signal to control the switch drive signal during the master state.

22. The resonant power converter of claim 21, wherein the frequency monitor module comprises:
a frequency reference oscillator coupled to provide a frequency reference; and
a frequency detector including a frequency comparator coupled to the frequency reference oscillator to measure the switching frequency of the switch drive signal in relation to the frequency reference.

23. The resonant power converter of claim 22, further comprising:
a switch control module coupled to generate a switch signal to control the switch drive signal during the slave state,
wherein the resonant power converter is configured to operate in a plurality of converter modes comprising a continuous switching mode and a burst mode, the burst mode comprising at least one burst-on period during which the switch drive signal comprises a nonzero switching frequency and at least one burst-off period during which the switch drive signal comprises a null switching frequency,
wherein the resonant power converter is configured to transition from the continuous switching mode to the burst mode at a burst transition time, and
wherein the frequency monitor module is configured to store a transition frequency measured by a frequency comparator of the frequency detector in a memory prior to the burst transition time.

24. The resonant power converter of claim 23, wherein the controller further comprises a multiplexor coupled to receive the switch signal and the clock signal, wherein the switches block is coupled to be driven in response to an output of the multiplexor in response to a multiplexor control signal.

25. The resonant power converter of claim 23, wherein the frequency monitor module is configured to operate in the slave state prior to the burst transition time and to operate in the master state for at least an initial time interval during the at least one burst-on period.

26. The resonant power converter of claim 25, wherein the frequency monitor module is configured to operate in the slave state subsequent to the initial time interval during the at least one burst-on period.

27. The resonant power converter of claim 25, wherein the frequency monitor module is configured to control the switch drive signal such that the switching frequency is substantially equal to the transition frequency.

28. The resonant power converter of claim 25, wherein the frequency monitor module is configured to control the switch drive signal such that the switching frequency is less than the transition frequency.

29. The resonant power converter of claim 28, wherein the switching frequency is substantially equal to sixty seven percent of the transition frequency.

30. The resonant power converter of claim 23, wherein the switch control module comprises at least one control loop comprising control loop circuits configured to control the switch drive signal and to control the switching frequency in relation to at least one feedback signal during the slave state, the at least one feedback signal indicative of a power stage signal.

31. The resonant power converter of claim 30, wherein the power stage signal comprises an output voltage.

32. The resonant power converter of claim 30, wherein the power stage signal comprises a switching current.

33. The resonant power converter of claim 30, wherein during the at least one burst-off period, the control loop circuits are configured to operate in a standby state.

34. The resonant power converter of claim 30,
wherein the at least one control loop comprises a voltage control loop and a current control loop,
wherein the at least one feedback signal comprises a first feedback signal and a second feedback signal,
wherein the voltage control loop is configured to provide a first signal and a second signal in relation to the first feedback signal,
wherein the current control loop is configured to provide a third signal in relation to the second feedback signal, and
wherein the at least one control loop is configured to control the switching frequency based upon a comparison of the first and second signals to the third signal.

35. The resonant power converter of claim 22, wherein the resonant power converter is configured to operate in a plurality of converter modes comprising a primary mode and a secondary mode and configured to transition from the primary mode to the secondary mode at a handover time, the resonant power converter further comprising:
a startup control circuit configured to control the switch drive signal during the primary mode,
wherein the frequency monitor module is configured to monitor the switching frequency during the primary mode and to store a handover frequency measured by a frequency comparator circuit prior to the handover time.

36. The resonant power converter of claim 35, wherein the frequency monitor module is configured to operate in the master state for at least an initial time interval subsequent to the handover time.

37. The resonant power converter of claim 36, wherein the frequency monitor module is configured to operate in the slave state subsequent to the initial time interval.

38. A method of controlling a switching signal in a switching power converter, comprising:
  controlling the switching signal using a switch control module during a continuous switching mode, the switch control module comprising at least one switch control circuit;
  monitoring a switching frequency of the switching signal using a frequency monitor module during the continuous switching mode;
  storing a transition frequency value of the switching frequency prior to transitioning from the continuous switching mode to a discontinuous mode; and
  controlling the switching signal using the frequency monitor module during the discontinuous mode.

39. The method of claim 38, wherein the switching power converter is a resonant converter.

40. The method of claim 38, wherein controlling the switching signal using the frequency monitor module during the discontinuous mode comprises:
  concurrently operating the at least one switch control circuit in a standby state.

41. The method of claim 38, wherein controlling the switching signal using the frequency monitor module during the discontinuous mode comprises:
  controlling the switching signal such that the switching frequency is substantially equal to the transition frequency value.

42. The method of claim 38, wherein controlling the switching signal using the frequency monitor module during the discontinuous mode comprises:
  controlling the switching signal such that the switching frequency is less than the transition frequency value.

43. The method of claim 42, wherein the switching frequency is substantially equal to sixty seven percent of the transition frequency value.

44. The method of claim 38, wherein controlling the switching signal using the frequency monitor module during the discontinuous mode comprises:
  controlling the switching signal for at least an initial time interval.

45. The method of claim 44, wherein controlling the switching signal using the frequency monitor module during the discontinuous mode further comprises:
  subsequently controlling the switching signal using the switch control module.

46. A method of starting a switching power converter, comprising:
  controlling a switching signal using a switch drive controller during a primary mode;
  monitoring a switching frequency of the switching signal using a frequency monitor module during the primary mode;
  storing a handover frequency value of the switching frequency prior to transitioning from the primary mode to a secondary mode; and
  controlling the switching signal using the frequency monitor module during the secondary mode.

47. The method of claim 46, wherein controlling the switching signal using the frequency monitor module during the secondary mode comprises:
  controlling the switching signal such that the switching frequency is substantially equal to the handover frequency value.

48. The method of claim 46, wherein controlling the switching signal using the frequency monitor module during the secondary mode comprises:
  controlling the switching signal for at least an initial time interval.

* * * * *